US011968670B2

(12) United States Patent
Datta et al.

(10) Patent No.: US 11,968,670 B2
(45) Date of Patent: Apr. 23, 2024

(54) PHYSICAL UPLINK CONTROL CHANNEL (PUCCH) RESOURCE SELECTION

(71) Applicant: QUALCOMM Incorporated, San Diego, CA (US)

(72) Inventors: Tanumay Datta, Bangalore (IN); Kapil Bhattad, Bangalore (IN); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/039,335

(22) Filed: Sep. 30, 2020

(65) Prior Publication Data

US 2021/0105764 A1 Apr. 8, 2021

(30) Foreign Application Priority Data

Oct. 4, 2019 (IN) ............................ 201941040266

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0016* (2013.01); *H04L 27/2607* (2013.01); *H04W 72/1263* (2013.01)

(58) Field of Classification Search
CPC .......... H04W 72/0413; H04W 72/1263; H04L 5/0016; H04L 27/2607
See application file for complete search history.

(56) References Cited

U.S. PATENT DOCUMENTS

2019/0045499 A1* 2/2019 Huang .................. H04L 5/0053
2019/0052421 A1* 2/2019 Yin ........................ H04B 1/713
(Continued)

FOREIGN PATENT DOCUMENTS

EP 3410808 A1 12/2018

OTHER PUBLICATIONS

CATT: “On PUCCH Resource Allocation”, 3GPP Draft, 3GPP TSG RAN WG1 Meeting #93, R1-1806298, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441505, 6 Pages, Retrieved from the Internet: URL: http://www.3gpp.org/ftp/Meetings%5F3GPP%5FSYNC/RAN1/Docs/. [retrieved on May 20, 2018] the whole document.
(Continued)

*Primary Examiner* — Khaled M Kassim
*Assistant Examiner* — Zhaohui Yang
(74) *Attorney, Agent, or Firm* — Arent Fox, LLP and Qualcomm, Incorporated

(57) ABSTRACT

This disclosure provides systems, methods and apparatus, including computer programs encoded on computer storage media, for physical uplink control channel (PUCCH) resource configuration. In one aspect, a base station may schedule a user equipment (UE) for PUCCH transmission based on a time division orthogonal cover code (TD-OCC) or a set of TD-OCCs, a cyclic shift step size or a set of cyclic shift step sizes, a first symbol or a set of first symbols, or a cyclic shift set. The base station may distinguish communications from that UE based on the TD-OCC or set of TD-OCCs, the cyclic shift step size or set of cyclic shift step sizes, the first symbol or set of first symbols, or the cyclic shift set.

30 Claims, 21 Drawing Sheets

(51) Int. Cl.
*H04L 27/26* (2006.01)
*H04W 72/1263* (2023.01)

(56) References Cited

U.S. PATENT DOCUMENTS

| | | | | |
|---|---|---|---|---|
| 2019/0158334 | A1* | 5/2019 | Kim | H04L 5/0083 |
| 2019/0239216 | A1* | 8/2019 | Kundu | H04L 5/0053 |
| 2019/0261356 | A1* | 8/2019 | Myung | H04W 72/04 |
| 2019/0297618 | A1 | 9/2019 | Yang et al. | |
| 2020/0196304 | A1* | 6/2020 | Han | H04L 5/0055 |
| 2020/0196343 | A1* | 6/2020 | Marinier | H04L 1/1854 |
| 2020/0280985 | A1* | 9/2020 | Ijaz | H04W 74/0833 |
| 2020/0351129 | A1* | 11/2020 | Kwak | H04B 7/0695 |
| 2021/0037484 | A1* | 2/2021 | Zhou | H04L 1/00 |
| 2021/0400696 | A1* | 12/2021 | Maki | H04W 72/0453 |
| 2022/0086824 | A1* | 3/2022 | Kundu | H04L 1/1812 |
| 2022/0166586 | A1* | 5/2022 | Kundu | H04L 5/0037 |
| 2022/0225428 | A1* | 7/2022 | Xiong | H04L 1/1864 |

OTHER PUBLICATIONS

Intel Corporation: "UL Signals and Channels for NR-Unlicensed", 3GPP Draft, 3GPP TSG RAN WG1 Meeting #99, R1-1913296. 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 19, 2019 (Nov. 19, 2019), XP051826633, 19 Pages, Retrieved from the Internet: URL: https://ftp.3gpp.org/tsg_ran/WG1_RL1/TSGR1_99/Docs/R1-913296.zip. R1-1913296—Intel—UL signals channels for NR-U.docx [retrieved on Nov. 19, 2019] the whole document.

International Search Report and Written Opinion—PCT/US2020/053814—ISA/EPO—dated Jan. 14, 2021.

LG Electronics: "Remaining issues on PUCCH resource allocation", 3GPP Draft, 3GPP TSG RAN WG1 Meeting #92bis, R1-1804557, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051426826, 6 Pages, Retrieved from the Internet: URL: http://www.3gpp.org/ftp/Meetings%5F3GPP%5FSYNC/RAN1/Docs/. [retrieved on Apr. 15, 2018] the whole document.

Motorola Mobility., et al., "Remaining Details on PUCCH Resource Allocation", 3GPP Draft, 3GPP TSG RAN WG1 Meeting #92bis, R1-1804956 Remaining Details on PUCCH Resource Allocation V0, 3rd Generation Partnership Project (3GPP), Mobile Competence Centre, 650, Route Des Lucioles, F-06921 Sophia-Antipolis Cedex, vol. RAN WG1, No. Sanya, China, Apr. 16, 2018-Apr. 20, 2018 Apr. 7, 2018 (Apr. 7, 2018), XP051414282, pp. 1-3, Retrieved from the Internet: URL:http://www.3gpp.org/ftp/tsg%5Fran/WG1%5FRL1/TSGR1%5F92b/Docs/ [retrieved on Apr. 7, 2018].

OPPO: "Summary of RAN1#92-bis Tdocs on PUCCH Resource Allocation", 3GPP Draft, 3GPP TSG RAN WG1 Meeting #92bis, R1-1805500, 3rd Generation Partnership Project (3GPP), Mobile Competence Centre, 650, Route Des Lucioles, F-06921 Sophia-Antipolis Cedex, France, vol. RAN WG1. No. Sanya. China, Apr. 16, 2018-Apr. 20, 2018, Apr. 16, 2018 (Apr. 16, 2018), XP051427535, 7 Pages, Retrieved from the Internet: URL: http://www.3gpp.org/ftp/Meetings%5F3GPP%5FSYNC/RAN1/Docs/. [retrieved on Apr. 16, 2018] the whole document.

* cited by examiner

400

| Index | PUCCH Format | First Symbol | Number of Symbols | PRB offset | Set of Initial CS Indices |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | ⌊NsizeBWP/4⌋ | {0, 3, 6, 9} |

FIG. 4

| Index | PUCCH Format | First Symbol | Number of Symbols | Interlace Index | Set of Initial CS Indices | TD-OCC |
|---|---|---|---|---|---|---|
| 0 | 0 | 12 | 2 | 0 | {0, 3} | {[1,1], [1,-1]} |
| 1 | 0 | 12 | 2 | 0 | {0, 4, 8} | [1,1] |
| 2 | 0 | 12 | 2 | 0 | {0, 4, 8} | [1,-1] |

600

| Index | PUCCH Format | First Symbol | Number of Symbols | Interlace Index | Set of Initial CS Indices |
|---|---|---|---|---|---|
| 4 | 1 | 10 | 4 | 0 | {0, 3, 6, 9} |
| 5 | 1 | 10 | 4 | 0 | {1, 4, 7, 10} |
| 6 | 1 | 10 | 4 | 0 | {2, 5, 8, 11} |

| Index | PUCCH Format | First Symbol | Number of Symbols | Interlace Index | Set of Initial CS Indices | Step Size |
|---|---|---|---|---|---|---|
| 0 | 0 | 12 | 2 | 0 | {0, 3} | {1, 7} |
| 1 | 0 | 12 | 2 | 0 | {0, 4, 8} | 1 |
| 2 | 0 | 12 | 2 | 0 | {0, 4, 8} | 7 |

| Index | PUCCH Format | First Symbol | Number of Symbols | Interlace Index | Set of Initial CS Indices |
|---|---|---|---|---|---|
| 0 | 0 | {4, 10} | 4 | 0 | {0, 3} |
| 1 | 0 | 12 | 2 | {0, 2} | {0, 4, 8} |
| 2 | 0 | 10 | 4 | {0, 2} | {0, 4, 8} |
| 3 | 1 | 8 | 6 | {0, 2} | {0, 6} |
| 4 | 1 | 6 | 8 | {0, 2} | {0, 3, 6, 9} |
| 5 | 1 | 2 | 12 | {0, 2} | {0, 3, 6, 9} |
| 6 | 1 | 0 | 14 | {0, 2} | {0, 3, 6, 9} |

| Index | PUCCH Format | First Symbol | Number of Symbols | Interlace Index | Set of Initial CS Indices |
|---|---|---|---|---|---|
| 0 | 0 | {9, 12} | 2 | {0, 2} | {0, 3} |
| 1 | 0 | {9, 12} | 2 | {0, 2} | {0, 4, 8} |
| 2 | 0 | {9, 12} | 2 | {0, 2} | {0, 4, 8} |
| 3 | 1 | 4 | 4 | {0, 2} | {0, 3, 6, 9} |
| 4 | 1 | 10 | 4 | {0, 2} | {0, 3, 6, 9} |
| 5 | 1 | 2 | 2 | {0, 2} | {0, 3, 6, 9} |
| 6 | 1 | 6 | 2 | {0, 2} | {0, 3, 6, 9} |
| 7 | 1 | 10 | 2 | {0, 2} | {0, 3, 6, 9} |

FIG. 8B 1060
1006
RB 48
RB 47
RB 46
RB 1
RB 0
X
1064
1062

PHYSICAL UPLINK CONTROL CHANNEL (PUCCH) RESOURCE SELECTION

CROSS REFERENCE TO RELATED APPLICATION(S)

This application claims the benefit of Indian Patent Application No. 201941040266, entitled "PHYSICAL UPLINK CONTROL CHANNEL (PUCCH) RESOURCE SELECTION" and filed on Oct. 4, 2019, which is expressly incorporated by reference herein in its entirety.

TECHNICAL FIELD

The present disclosure relates generally to communication systems, and more particularly, to a mobile wireless communication system.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter of this disclosure can be implemented in a method of wireless communication at a user equipment (UE). The method includes receiving a physical uplink control channel (PUCCH) resource set index and a PUCCH resource indicator (PRI) from a base station, the PRI being received in a physical downlink control channel (PDCCH); determining a PUCCH resource set based on the PUCCH resource set index and a PUCCH resource index, the PUCCH resource index being based on the PRI and the PDCCH location carrying the PRI, where at least one of a time division orthogonal cover code (TD-OCC), a cyclic shift step size, a first symbol, or a cyclic shift set of the determined PUCCH resource set is determined based on the PUCCH resource set index or the PUCCH resource index; and transmitting uplink control information in a PUCCH based on the determined PUCCH resource set.

In some implementations, the first symbol of the determined PUCCH resource set is determined based on the PUCCH resource index or the TD-OCC of the determined PUCCH resource set is determined based on the PUCCH resource set index or the PUCCH resource index.

In some implementations, the first symbol or the cyclic shift set of the determined PUCCH resource set is determined based on the PUCCH resource index or the TD-OCC or the cyclic shift step size of the determined PUCCH resource set is determined based on the PUCCH resource set index or the PUCCH resource index.

In some implementations, the PUCCH resource set index may correspond to a configured PUCCH resource set having a set of TD-OCCs, where the TD-OCC of the determined PUCCH resource set is selected from the set of TD-OCCs based on the PUCCH resource index, and the uplink control information may be transmitted based on the TD-OCC of the determined PUCCH resource set.

In some implementations, the PUCCH resource set index may correspond to a configured PUCCH resource set having a configured TD-OCC, the TD-OCC of the determined PUCCH resource set may be determined to be the configured TD-OCC, and the uplink control information may be transmitted based on the TD-OCC of the determined PUCCH resource set.

In some implementations, a cyclic shift set of the determined PUCCH resource set is determined based on the PUCCH resource set index or the PUCCH resource index, the UE may have a plurality of configured PUCCH resource sets having at least two cyclic shift sets, the two cyclic shift sets having no common values, the PUCCH resource set index may correspond to a configured PUCCH resource set of the plurality of configured PUCCH resource sets having a configured cyclic shift set that is one of the at least two cyclic shift sets having no common values, the cyclic shift set of the determined PUCCH resource set may be determined to be the configured cyclic shift set, and the uplink control information may be transmitted based on the cyclic shift set of the determined PUCCH resource set.

In some implementations, the at least two cyclic shift sets having no common values may include {0, 3, 6, 9} and {1, 4, 7, 10}.

In some implementations, the PUCCH resource set index corresponds to a configured PUCCH resource set having a set of step size options, the step size of the determined PUCCH resource set may be selected from the set of step size options based on the PUCCH resource index, and the uplink control information may be transmitted based on the step size of the determined PUCCH resource.

In some implementations, the PUCCH resource set index may correspond to a configured PUCCH resource set having a configured step size, the step size of the determined PUCCH resource set may be determined to be the configured step size, and the uplink control information may be transmitted based on the step size of the determined PUCCH resource set.

In some implementations, the PUCCH resource set index may correspond to a configured PUCCH resource set having a set of first symbol options, the first symbol of the determined PUCCH resource set may be selected from the set of first symbol options based on the PUCCH resource index, and the uplink control information may be transmitted based on the first symbol of the determined PUCCH resource.

In some implementations, the configured PUCCH resource set may have a configured number of symbols, and each first symbol of the set of first symbol options may be separated from the other first symbols of the set of first symbol options by at least a number of symbols equal to the configured number of symbols.

In some implementations, the set of first symbol options include four and ten, and a configured number of symbols of the configured PUCCH resource set may be four.

In some implementations, each first symbol of the set of first symbol options, in combination with a configured number of symbols of the configured PUCCH resource set, may provide a listen-before-talk (LBT) symbol gap between PUCCH transmissions sent based on other first symbols in the set of first symbol options.

In some implementations, the UE may have a plurality of configured PUCCH resource sets having at least five distinct values for a first symbol, the PUCCH resource set index may correspond to a configured PUCCH resource set of the plurality of configured PUCCH resource sets having a configured first symbol having one of the at least five distinct values for a first symbol, the first symbol of the determined PUCCH resource set may be determined to be the configured first symbol, and the uplink control information may be transmitted based on the first symbol of the determined PUCCH resource set.

In some implementations, the at least five distinct values for a first symbol may include zero, four, ten, twelve, and at least one of six, eight, and two.

In some implementations, the PUCCH resource set may include an interlace index and the UE transmits the uplink control information in the PUCCH based on the interlace index.

In some implementations, a bandwidth part may include non-abbreviated interlaces and abbreviated interlaces, the determining the PUCCH resource set based on the PUCCH resource set index and the PUCCH resource index may include determining a PUCCH resource set corresponding to a non-abbreviated interlace, and the transmitting uplink control information in the PUCCH based on the determined PUCCH resource set may include transmitting the uplink control information on a non-abbreviated interlace of the bandwidth part.

In some implementations, the abbreviated interlaces may include nine or fewer resource blocks (RBs) and the non-abbreviated interlaces include ten or more RBs.

In some implementations, the bandwidth part may include five interlaces, one interlace of the five interlaces may be an abbreviated interlace, and four of the five interlaces may be non-abbreviated interlaces.

In some implementations, an abbreviated interlace may be an interlace that includes a resource block that overlaps with a guard band, and a non-abbreviated interlace may be an interlace that does not include the resource block that overlaps with the guard band.

In some implementations, the transmitting uplink control information in the PUCCH based on the determined PUCCH resource set may include transmitting the uplink control information on a non-abbreviated interlace and an abbreviated interlace of the bandwidth part.

In some implementations, the method can include determining the UE is scheduled to transmit on R RBs, R not being equal to (2m)*(3n)*(5p), where R is a positive integer and m, n, and p are all non-negative integers and determining to drop an RB of the R RBs that will cause the smallest reduction in occupied channel bandwidth.

In some implementations, the TD-OCC and the first symbol of the determined PUCCH resource set may be determined based on the PUCCH resource set index or the PUCCH resource index.

In some implementations, the parameters of the PUCCH resource set may provide X possible resource combinations, the PUCCH resource index may have X+N possible values, a first X PUCCH resource indices may be mapped to corresponding resource combinations, and the determining the PUCCH resource set based on the PUCCH resource index may include receiving a PUCCH resource index having a value greater than X and determining the PUCCH resource based on the resource combination corresponding to the PUCCH resource set and PUCCH resource index.

In some implementations, the received PUCCH resource index may be K, K being greater than the X, and the determined PUCCH resource may correspond to the Kth PUCCH resource index.

Another innovative aspect of the subject matter described in this application can be implemented in an apparatus for wireless communication including means for receiving a physical uplink control channel (PUCCH) resource set index and a PUCCH resource indicator (PRI) from a base station, the PRI being received in a physical downlink control channel (PDCCH), means for determining a PUCCH resource set based on the PUCCH resource set index and a PUCCH resource index, the PUCCH resource index being based on the PRI and the PDCCH location carrying the PRI, where at least one of a time division orthogonal cover code (TD-OCC), a cyclic shift step size, a first symbol, or a cyclic shift set of the determined PUCCH resource set is determined based on the PUCCH resource set index or the PUCCH resource index, and means for transmitting uplink control information in a PUCCH based on the determined PUCCH resource set.

In some aspects, the method can include means for determining the UE is scheduled to transmit on R RBs, R not being equal to (2m)*(3n)*(5p), where R is a positive integer and m, n, and p are all non-negative integers, and means for determining to drop an RB of the R RBs that will cause the smallest reduction in occupied channel bandwidth.

Another innovative aspect of the subject matter described in this application can be implemented in an apparatus for wireless communication, including a first interface configured to obtain a physical uplink control channel (PUCCH) resource set index and a PUCCH resource indicator (PRI) from a base station, the PRI being received in a physical downlink control channel (PDCCH), a processing system configured to determine a PUCCH resource set based on the PUCCH resource set index and a PUCCH resource index, the PUCCH resource index being based on the PRI and the PDCCH location carrying the PRI, where at least one of a time division orthogonal cover code (TD-OCC), a cyclic shift step size, a first symbol, or a cyclic shift set of the determined PUCCH resource set is determined based on the PUCCH resource set index or the PUCCH resource index, and a second interface configured to output uplink control information in a PUCCH based on the determined PUCCH resource set.

In some implementations, the first symbol of the determined PUCCH resource set is determined based on the PUCCH resource index or the TD-OCC of the determined PUCCH resource set is determined based on the PUCCH resource set index or the PUCCH resource index.

In some implementations, the first symbol or the cyclic shift set of the determined PUCCH resource set is determined based on the PUCCH resource index or the TD-OCC or the cyclic shift step size of the determined PUCCH resource set is determined based on the PUCCH resource set index or the PUCCH resource index.

In some implementations, the PUCCH resource set index may correspond to a configured PUCCH resource set having a set of TD-OCCs, the TD-OCC of the determined PUCCH resource set may be selected from the set of TD-OCCs based on the PUCCH resource index, and the uplink control information may be transmitted based on the TD-OCC of the determined PUCCH resource set.

In some implementations, the PUCCH resource set index corresponds to a configured PUCCH resource set having a configured TD-OCC, where the TD-OCC of the determined PUCCH resource set is determined to be the configured TD-OCC, and where the uplink control information is transmitted based on the TD-OCC of the determined PUCCH resource set.

In some implementations, the processing system may be further configured to determine a cyclic shift set of the determined PUCCH resource set based on the PUCCH resource set index or the PUCCH resource index, the UE may have a plurality of configured PUCCH resource sets having at least two cyclic shift sets, the two cyclic shift sets having no common values, the PUCCH resource set index may correspond to a configured PUCCH resource set of the plurality of configured PUCCH resource sets having a configured cyclic shift set that is one of the at least two cyclic shift sets having no common values, the cyclic shift set of the determined PUCCH resource set may be determined to be the configured cyclic shift set, and the uplink control information may be transmitted based on the cyclic shift set of the determined PUCCH resource set.

In some implementations, the at least two cyclic shift sets having no common values may include {0, 3, 6, 9} and {1, 4, 7, 10}.

In some implementations, the PUCCH resource set index may correspond to a configured PUCCH resource set having a set of step size options, where the step size of the determined PUCCH resource set may be selected from the set of step size options based on the PUCCH resource index, and the uplink control information may be transmitted based on the step size of the determined PUCCH resource.

In some implementations, the PUCCH resource set index may correspond to a configured PUCCH resource set having a configured step size, the step size of the determined PUCCH resource set may be determined to be the configured step size, and the uplink control information may be transmitted based on the step size of the determined PUCCH resource set.

In some implementations, the PUCCH resource set index may correspond to a configured PUCCH resource set having a set of first symbol options, where the first symbol of the determined PUCCH resource set is selected from the set of first symbol options based on the PUCCH resource index, and where the uplink control information is transmitted based on the first symbol of the determined PUCCH resource.

In some implementations, the configured PUCCH resource set may have a configured number of symbols, and where each first symbol of the set of first symbol options is separated from the other first symbols of the set of first symbol options by at least a number of symbols equal to the configured number of symbols.

In some implementations, the set of first symbol options may include four and ten, and a configured number of symbols of the configured PUCCH resource set may be four.

In some implementations, each first symbol of the set of first symbol options, in combination with a configured number of symbols of the configured PUCCH resource set, may provide a listen-before-talk (LBT) symbol gap between PUCCH transmissions sent based on other first symbols in the set of first symbol options.

In some implementations, the UE may have a plurality of configured PUCCH resource sets having at least five distinct values for a first symbol, the PUCCH resource set index may correspond to a configured PUCCH resource set of the plurality of configured PUCCH resource sets having a configured first symbol having one of the at least five distinct values for a first symbol, the first symbol of the determined PUCCH resource set may be determined to be the configured first symbol, and the uplink control information may be transmitted based on the first symbol of the determined PUCCH resource set.

In some implementations, the at least five distinct values for a first symbol may include zero, four, ten, twelve, and at least one of six, eight, and two.

In some implementations, the PUCCH resource set may include an interlace index and the UE transmits the uplink control information in the PUCCH based on the interlace index.

In some implementations, a bandwidth part may include non-abbreviated interlaces and abbreviated interlaces, the determining the PUCCH resource set based on the PUCCH resource set index and the PUCCH resource index may include determining a PUCCH resource set corresponding to a non-abbreviated interlace, and the transmitting uplink control information in the PUCCH based on the determined PUCCH resource set may include transmitting the uplink control information on a non-abbreviated interlace of the bandwidth part.

In some implementations, the abbreviated interlaces may include nine or fewer resource blocks (RBs) and the non-abbreviated interlaces include ten or more RBs.

In some implementations, the bandwidth part includes five interlaces, one interlace of the five interlaces may be an abbreviated interlace, and four of the five interlaces may be non-abbreviated interlaces.

In some implementations, an abbreviated interlace may be an interlace that includes a resource block that overlaps with a guard band, and a non-abbreviated interlace may be an interlace that does not include the resource block that overlaps with the guard band.

In some implementations, the transmitting uplink control information in the PUCCH based on the determined PUCCH resource set includes transmitting the uplink control information on a non-abbreviated interlace and an abbreviated interlace of the bandwidth part.

In some implementations, the apparatus can determine the UE is scheduled to transmit on R RBs, R not being equal to (2m)*(3n)*(5p), where R is a positive integer and m, n, and p are all non-negative integers, and determine to drop an RB of the R RBs that will cause the smallest reduction in occupied channel bandwidth.

In some implementations, the TD-OCC and the first symbol of the determined PUCCH resource set may be determined based on the PUCCH resource set index or the PUCCH resource index.

In some implementations, the parameters of the PUCCH resource set may provide X possible resource combinations, the PUCCH resource index may have X+N possible values, a first X PUCCH resource indices may be mapped to corresponding resource combinations, and the determining the PUCCH resource set based on the PUCCH resource index may include receiving a PUCCH resource index having a value greater than X and determining the PUCCH resource based on the resource combination corresponding to the PUCCH resource set and PUCCH resource index.

In some implementations, the received PUCCH resource index may be K, K being greater than the X, and the determined PUCCH resource may correspond to the Kth PUCCH resource index.

Another innovative aspect of the subject matter described in this disclosure can be implemented in a computer-readable medium storing computer executable code, the code when executed by a processor cause the processor to perform the method described above.

Another innovative aspect of the subject matter described in this disclosure can be implemented in a method of wireless communication at a base station. The method may include scheduling a user equipment (UE) to transmit uplink control information on scheduled resources of a PUCCH, the scheduled resources having at least one of a scheduled TD-OCC, a scheduled cyclic shift step size, a scheduled first symbol, or a scheduled cyclic shift set, determining a PUCCH resource set index, a PRI, and a PDCCH location for the PRI corresponding to the scheduled resources of the PUCCH, transmitting the PUCCH resource set index to the UE, transmitting the PRI to the UE at the PDCCH location, and demultiplexing the PUCCH based on at least one of the scheduled TD-OCC, the scheduled cyclic shift step size, the scheduled first symbol, or the scheduled cyclic shift set to receive the uplink control information of the UE.

In some implementations, the scheduled resources have at least one of the scheduled TD-OCC or the scheduled first symbol, and the base station may determine the PRI and a PDCCH location for the PRI based on the scheduled first symbol or may determine the PUCCH resource set index, the PRI, and the PDCCH location for the PRI based on the TD-OCC. The base station may demultiplex the PUCCH based on at least one of the scheduled TD-OCC or the scheduled first symbol.

In some implementations, the scheduled resources have at least one of the TD-OCC, the scheduled cyclic shift step size, the scheduled first symbol, or the scheduled cyclic shift set. The base station may determine the PRI and a PDCCH location for the PRI based on the scheduled first symbol or the scheduled cyclic shift set or may determine the PUCCH resource set index, the PRI, and the PDCCH location for the PRI based on the TD-OCC or the cyclic shift step size.

In some implementations, where the PUCCH resource set index may correspond to a configured PUCCH resource set having a set of TD-OCCs, the set of TD-OCCs including the scheduled TD-OCC, and the PRI and the location of the PRI on the PDCCH may correspond to a position of the scheduled TD-OCC in the set of TD-OCCs.

In some implementations, the UE may have a plurality of configured PUCCH resource sets having at least two cyclic shift sets, the two cyclic shift sets having no common values, the PUCCH resource set index may correspond to a configured PUCCH resource set of the plurality of configured PUCCH resource sets having a configured cyclic shift set that is one of the at least two cyclic shift sets having no common values, and the configured cyclic shift set may be a scheduled cyclic shift set, wherein at least one of the PUCCH resource set index, the PRI, and the PDCCH location for the PRI are determined further based on the scheduled cyclic shift set.

In some implementations, the PUCCH resource set index may correspond to a configured PUCCH resource set having a set of cyclic shift step size options, the set of cyclic shift step size options including the scheduled cyclic shift step size, and the PRI and the location of the PRI on the PDCCH may correspond to a position of the scheduled cyclic shift step size in the set of cyclic shift step size options.

In some implementations, the PUCCH resource set index may correspond to a configured PUCCH resource set having a set of first symbol options, the set of first symbol options including the scheduled first symbol, and the PRI and the location of the PRI on the PDCCH may correspond to a position of the scheduled first symbol in the set of first symbol options.

In some implementations, the UE mays a plurality of configured PUCCH resource sets having at least five distinct values for a first symbol, the PUCCH resource set index may correspond to a configured PUCCH resource set of the plurality of configured PUCCH resource sets having a configured first symbol having one of the at least five distinct values for a first symbol, and the configured first symbol may be the scheduled first symbol.

In some implementations, the scheduled resources of the PUCCH may include a scheduled interlace, and the PUCCH resource set index may correspond to a configured PUCCH resource set having an interlace index corresponding to the scheduled interlace.

In some implementations, a bandwidth part may include non-abbreviated interlaces and abbreviated interlaces and the scheduled interlace may be a non-abbreviated interlace.

In some implementations, an abbreviated interlace may be an interlace that includes a resource block that overlaps with a guard band, and a non-abbreviated interlace may be an interlace that does not include the resource block that overlaps with the guard band.

Another innovative aspect of the subject matter described in this disclosure can be implemented in an apparatus for wireless communication, including means for scheduling a user equipment (UE) to transmit uplink control information on scheduled resources of a PUCCH, the scheduled resources having at least one of a scheduled TD-OCC, a scheduled cyclic shift step size, a scheduled first symbol, or a scheduled cyclic shift set, means for determining a PUCCH resource set index, a PRI, and a PDCCH location for the PRI corresponding to the scheduled resources of the PUCCH, means for transmitting the PUCCH resource set index to the UE, means for transmitting the PRI to the UE at the PDCCH location, and means for demultiplexing the PUCCH based on at least one of the scheduled TD-OCC, the scheduled cyclic shift step size, the scheduled first symbol, or the scheduled cyclic shift set to receive the uplink control information of the UE.

Another innovative aspect of the subject matter described in this disclosure can be implemented in an apparatus for wireless communication. The apparatus includes a processing system configured to schedule a user equipment (UE) to transmit uplink control information on scheduled resources of a PUCCH, the scheduled resources having at least one of a scheduled TD-OCC, a scheduled cyclic shift step size, a scheduled first symbol, or a scheduled cyclic shift set, determine a PUCCH resource set index, a PRI, and a PDCCH location for the PRI corresponding to the scheduled resources of the PUCCH, and demultiplex the PUCCH based on at least one of the scheduled TD-OCC, the scheduled cyclic shift step size, the scheduled first symbol, or the scheduled cyclic shift set to receive the uplink control information of the UE. The apparatus also includes a first interface configured to output the PUCCH resource set index to the UE, and output the PRI for transmission to the UE at the PDCCH location.

In some implementations, the scheduled resources have at least one of the scheduled TD-OCC or the scheduled first symbol, and the processing system may determine the PRI and a PDCCH location for the PRI based on the scheduled first symbol or may determine the PUCCH resource set index, the PRI, and the PDCCH location for the PRI based on the TD-OCC. The processing system may demultiplex the PUCCH based on at least one of the scheduled TD-OCC or the scheduled first symbol.

In some implementations, the scheduled resources have at least one of the TD-OCC, the scheduled cyclic shift step size, the scheduled first symbol, or the scheduled cyclic shift set. The processing system may determine the PRI and a PDCCH location for the PRI based on the scheduled first symbol or the scheduled cyclic shift set or may determine the PUCCH resource set index, the PRI, and the PDCCH location for the PRI based on the TD-OCC or the cyclic shift step size.

In some implementations, the PUCCH resource set index may correspond to a configured PUCCH resource set having a set of TD-OCCs, the set of TD-OCCs including the scheduled TD-OCC, and the PRI and the location of the PRI on the PDCCH may correspond to a position of the scheduled TD-OCC in the set of TD-OCCs.

In some implementations, the UE may have a plurality of configured PUCCH resource sets having at least two cyclic shift sets, the two cyclic shift sets having no common values, the PUCCH resource set index may correspond to a configured PUCCH resource set of the plurality of configured PUCCH resource sets having a configured cyclic shift set that is one of the at least two cyclic shift sets having no common values, and the configured cyclic shift set may be a scheduled cyclic shift set, wherein at least one of the PUCCH resource set index, the PRI, and the PDCCH location for the PRI are determined further based on the scheduled cyclic shift set.

In some implementations, the PUCCH resource set index may correspond to a configured PUCCH resource set having a set of cyclic shift step size options, the set of cyclic shift step size options including the scheduled cyclic shift step size, and the PRI and the location of the PRI on the PDCCH may correspond to a position of the scheduled cyclic shift step size in the set of cyclic shift step size options.

In some implementations, the PUCCH resource set index may correspond to a configured PUCCH resource set having a set of first symbol options, the set of first symbol options including the scheduled first symbol, and the PRI and the location of the PRI on the PDCCH may correspond to a position of the scheduled first symbol in the set of first symbol options.

In some implementations, the UE may have a plurality of configured PUCCH resource sets having at least five distinct values for a first symbol, the PUCCH resource set index may correspond to a configured PUCCH resource set of the plurality of configured PUCCH resource sets having a configured first symbol having one of the at least five distinct values for a first symbol, and the configured first symbol may be the scheduled first symbol.

In some implementations, the scheduled resources of the PUCCH may include a scheduled interlace, and the PUCCH resource set index may correspond to a configured PUCCH resource set having an interlace index corresponding to the scheduled interlace.

In some implementations, a bandwidth part may include non-abbreviated interlaces and abbreviated interlaces and the scheduled interlace may be a non-abbreviated interlace.

In some implementations, an abbreviated interlace may be an interlace that includes a resource block that overlaps with a guard band, and a non-abbreviated interlace may be an interlace that does not include the resource block that overlaps with the guard band.

Another innovative aspect of the subject matter described in this disclosure can be implemented in a computer-readable medium storing computer executable code, the code when executed by a processor cause the processor to perform the method described above.

Another innovative aspect of the subject matter described in this disclosure can be implemented in a method of wireless communication at a base station. The method includes scheduling a user equipment (UE) to transmit uplink control information on scheduled resources of a bandwidth part, the bandwidth part including an abbreviated interlace and a non-abbreviated interlace, determining a PUCCH resource set index corresponding to the non-abbreviated interlace, transmitting the PUCCH resource set index to the UE, and receiving the uplink control information from the UE on the non-abbreviated interlace.

In some implementations, an abbreviated interlace may be an interlace that includes a resource block that overlaps with a guard band, and a non-abbreviated interlace may be an interlace that does not include the resource block that overlaps with the guard band.

In some implementations, the method can include scheduling the UE to transmit uplink control information on the abbreviated interlace and the non-abbreviated interlace and receiving the uplink control information from the UE on the non-abbreviated interlace and the abbreviated interlace.

In some implementations, the scheduled resources may include interlaces having R RBs, R not being equal to (2m)*(3n)*(5p), where R, m, n, and p are all positive integers.

Another innovative aspect of the subject matter described in this disclosure can be implemented in an apparatus for wireless communication, including means for scheduling a user equipment (UE) to transmit uplink control information on scheduled resources of a bandwidth part, the bandwidth part including an abbreviated interlace and a non-abbreviated interlace, means for determining a PUCCH resource set index corresponding to the non-abbreviated interlace, means for transmitting the PUCCH resource set index to the UE, and means for receiving the uplink control information from the UE on the non-abbreviated interlace.

Another innovative aspect of the subject matter described in this disclosure can be implemented in an apparatus for wireless communication. The apparatus includes a processor system configured to schedule a user equipment (UE) to transmit uplink control information on scheduled resources of a bandwidth part, the bandwidth part including an abbreviated interlace and a non-abbreviated interlace, and determine a PUCCH resource set index corresponding to the non-abbreviated interlace. The apparatus also includes a first interface configured to output the PUCCH resource set index to the UE and a second interface configured to obtain the uplink control information from the UE on the non-abbreviated interlace.

In some implementations, an abbreviated interlace may be an interlace that includes a resource block that overlaps with a guard band, and a non-abbreviated interlace may be an interlace that does not include the resource block that overlaps with the guard band.

In some implementations, the processing system may be further configured to schedule the UE to transmit uplink control information on the abbreviated interlace and the non-abbreviated interlace and receiving the uplink control information from the UE on the non-abbreviated interlace and the abbreviated interlace.

In some implementations, the scheduled resources may include interlaces having R RBs, R not being equal to (2m)*(3n)*(5p), where R, m, n, and p are all positive integers.

Another innovative aspect of the subject matter described in this disclosure can be implemented in a computer-readable medium storing computer executable code, the code when executed by a processor cause the processor to perform the method described above.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 4 is a table illustrating example configured PUCCH resource sets.

FIG. 6 is a table illustrating example configured PUCCH resource sets for PUCCH transmissions with varied cyclic shifts.

FIG. 7 is a table illustrating example configured PUCCH resources sets for PUCCH transmissions encoded with a cyclic shift step size.

FIG. 8A is a table illustrating example configured PUCCH resource sets for PUCCH transmissions to be transmitted on varied symbols.

FIG. 8B is a table illustrating example configured PUCCH resource sets for PUCCH transmissions to be transmitted on varied symbols.

Like reference numbers and designations in the various drawings indicate like elements.

DETAILED DESCRIPTION

Figure 1:
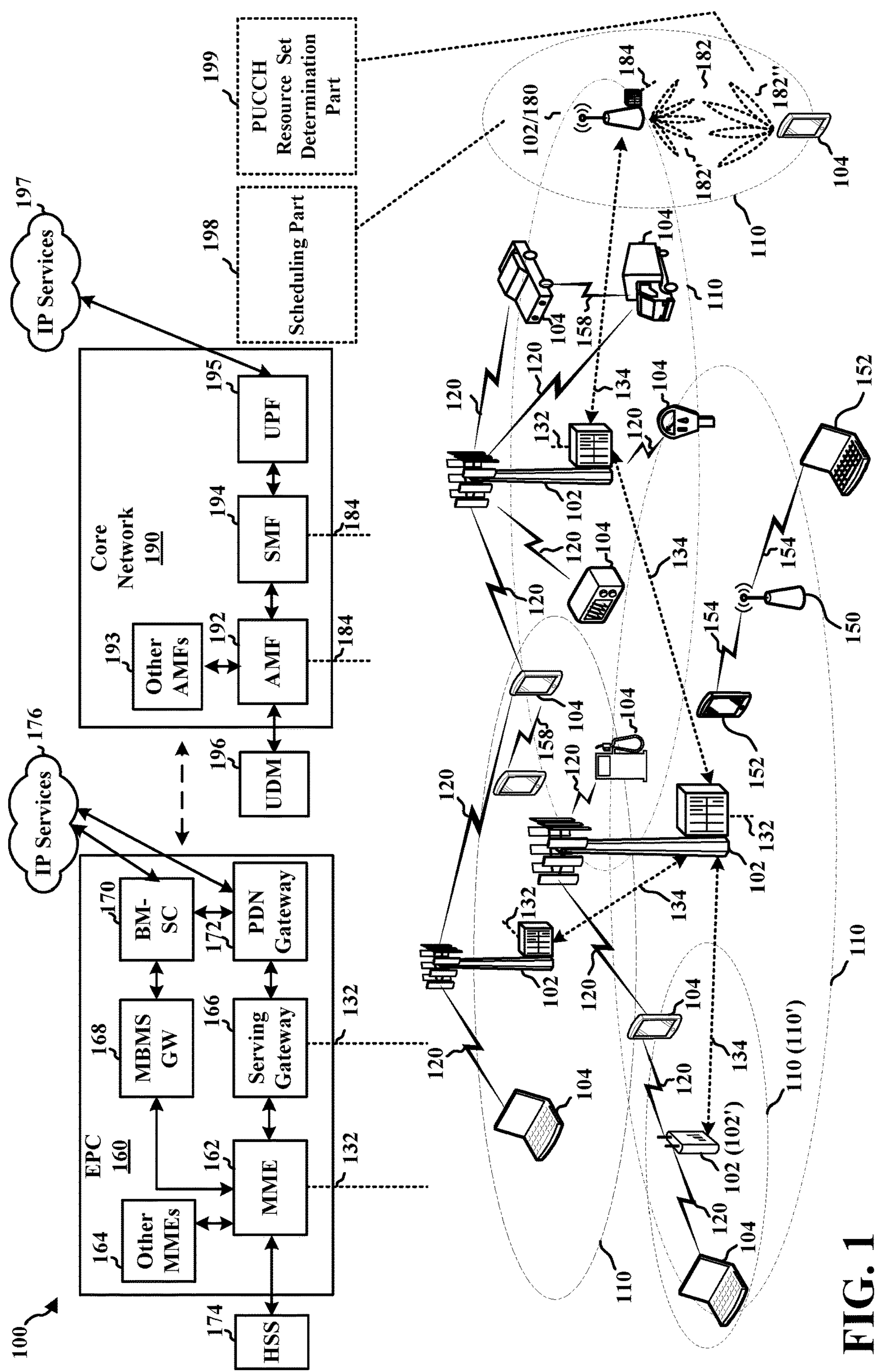
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (TOT) network, such as a system utilizing 3G, 4G or 5G, or further implementations thereof, technology.

A base station scheduling user equipments (UEs) for transmitting physical uplink control channels (PUCCHs) may identify resources for the PUCCHs using PUCCH resource set indices and PUCCH resource indicators. The base station may have a limited number of resources that can be identified by the PUCCH resource set index and the PUCCH resource identifier for the UEs to transmit on. Wideband physical uplink control channel (PUCCH) resources may be interlaces, not individual physical resource blocks (PRBs), which may further limit the number of resources available for scheduling. Downlink control information (DCI) from a base station may be able to signal up to sixteen possible resources per PUCCH resource set, but a given PUCCH resource set may not have adequate resource options to utilize all sixteen possible signals.

To address the above, a base station may schedule a UE for PUCCH transmission based on a time division orthogonal cover codes (TD-OCC) or a set of TD-OCCs, a cyclic shift step size or a set of cyclic shift step sizes, a first symbol or a set of first symbols, or a cyclic shift set, and the base station may distinguish communications from that UE based on the TD-OCC or set of TD-OCCs, the cyclic shift step size or set of cyclic shift step sizes, the first symbol or set of first symbols, or the cyclic shift set. This may result in additional resources available for scheduling, improved utilization of DCI resources dedicated to PUCCH resource signaling, or improved scheduling flexibility.

Further, interlaces in sub bands toward the edge of a bandwidth part may experience a guard band overlapping a resource block (RB), reducing the size of the interlace that would otherwise include that RB. The reduced-size interlace, or abbreviated interlace, may have inadequate RBs to schedule a transmission such as a PUCCH transmission, or may have inadequate occupied channel bandwidth. Accordingly, a base station may schedule a UE to transmit a PUCCH transmission during an interlace which is not an abbreviated interlace, and which may therefore have the desired number of RBs and occupied channel bandwidth. The abbreviated interlace may be used in other ways to conserve uplink resources.

The present disclosure provides methods and apparatuses for communication between a base station and a user equipment (UE). The base station may schedule the UE for transmitting uplink control information on physical uplink control channel (PUCCH) resources. The base station may schedule different UEs with PUCCH resources having different aspects such as a time division orthogonal cover codes (TD-OCCs), cyclic shift step sizes, first symbols, or sets of cyclic shift step sizes. The base station and the UE may utilize configured PUCCH resource sets to communicate which PUCCH resources the base station has scheduled for the UE. The configured PUCCH resources sets allow the base station to signal different PUCCH resources, including different TD-OCCs, cyclic shift step sizes, first symbols, or sets of cyclic shift step sizes, to scheduled UEs. The configured PUCCH resource sets may include different configured PUCCH resource sets with distinct configured values TD-OCCs, cyclic shift step sizes, first symbols, or sets of cyclic shift step sizes. The configured PUCCH resource sets may additionally or alternatively include sets of values for TD-OCCs, cyclic shift step sizes, or first symbols, and the base station may signal which value of the set should be used.

Particular implementations of the subject matter described in this disclosure can be implemented to realize one or more of the following potential advantages. The disclosed PUCCH resource scheduling techniques may increase the number of resources available for scheduling, which may improve scheduling flexibility or may allow for a larger number of UEs to be scheduled to transmit during a given uplink period. The disclosed PUCCH resource scheduling techniques also may improve utilization of downlink control information (DCI) resources dedicated to PUCCH resource signaling, providing improved scheduling flexibility or a larger number of scheduled UEs without requiring additional DCI resources.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some implementations, the base station 180 may include a scheduling part 198 configured to schedule a UE based on novel resources. In some implementations, the UE 104 may include a PUCCH resource set determination part 199 configured to determine what PUCCH resources to transmit a PUCCH transmission on, including the novel resources. Although the following description may be focused on 5G NR, the concepts described herein may be applicable to other similar areas, such as LTE, LTE-A, CDMA, GSM, and other wireless technologies.

Figures 2A, 2B, 2C, 2D:
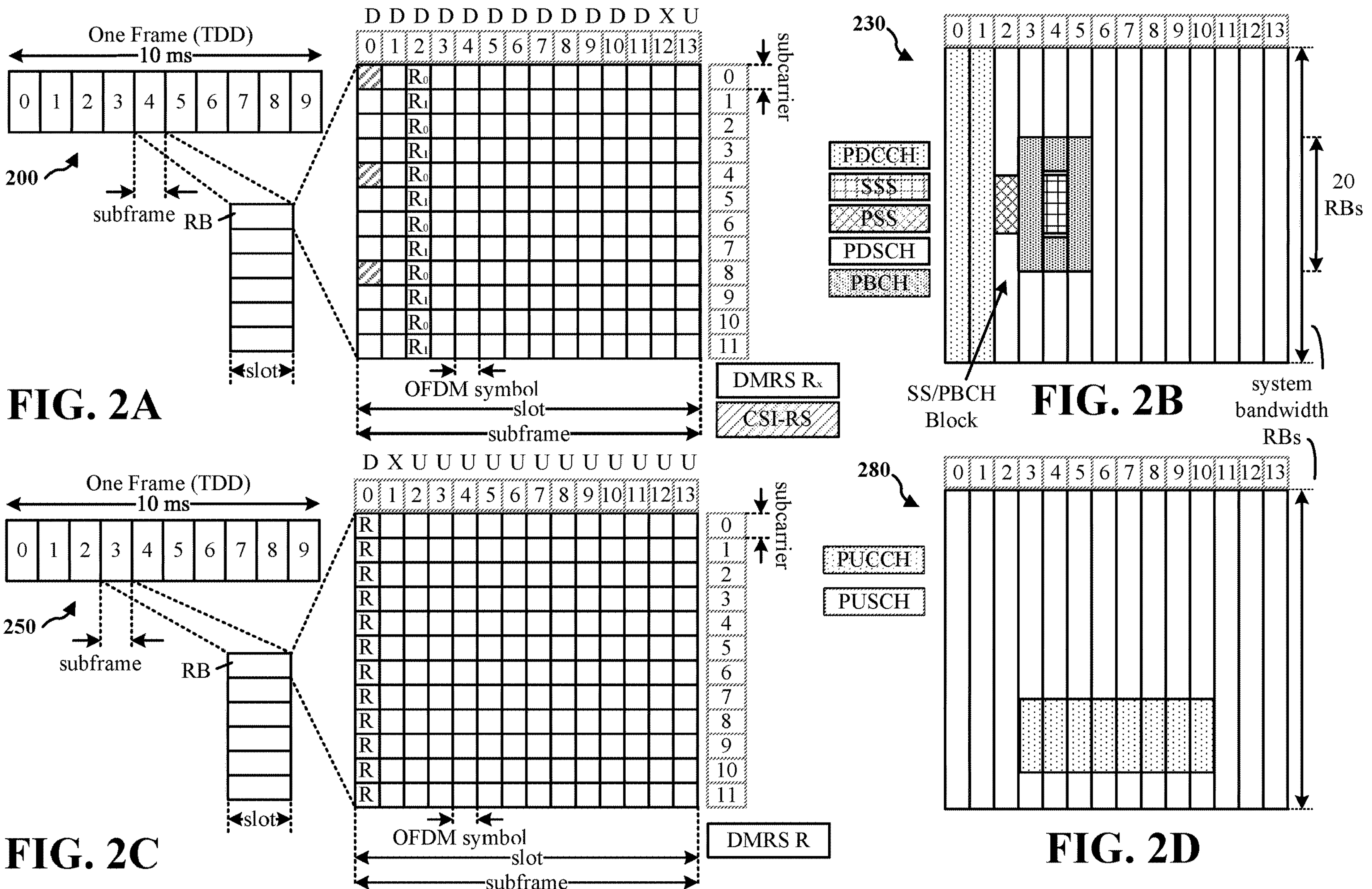
FIGS. 2A-2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (B SR), a power headroom report (PHR), or UCI.

Figure 3:
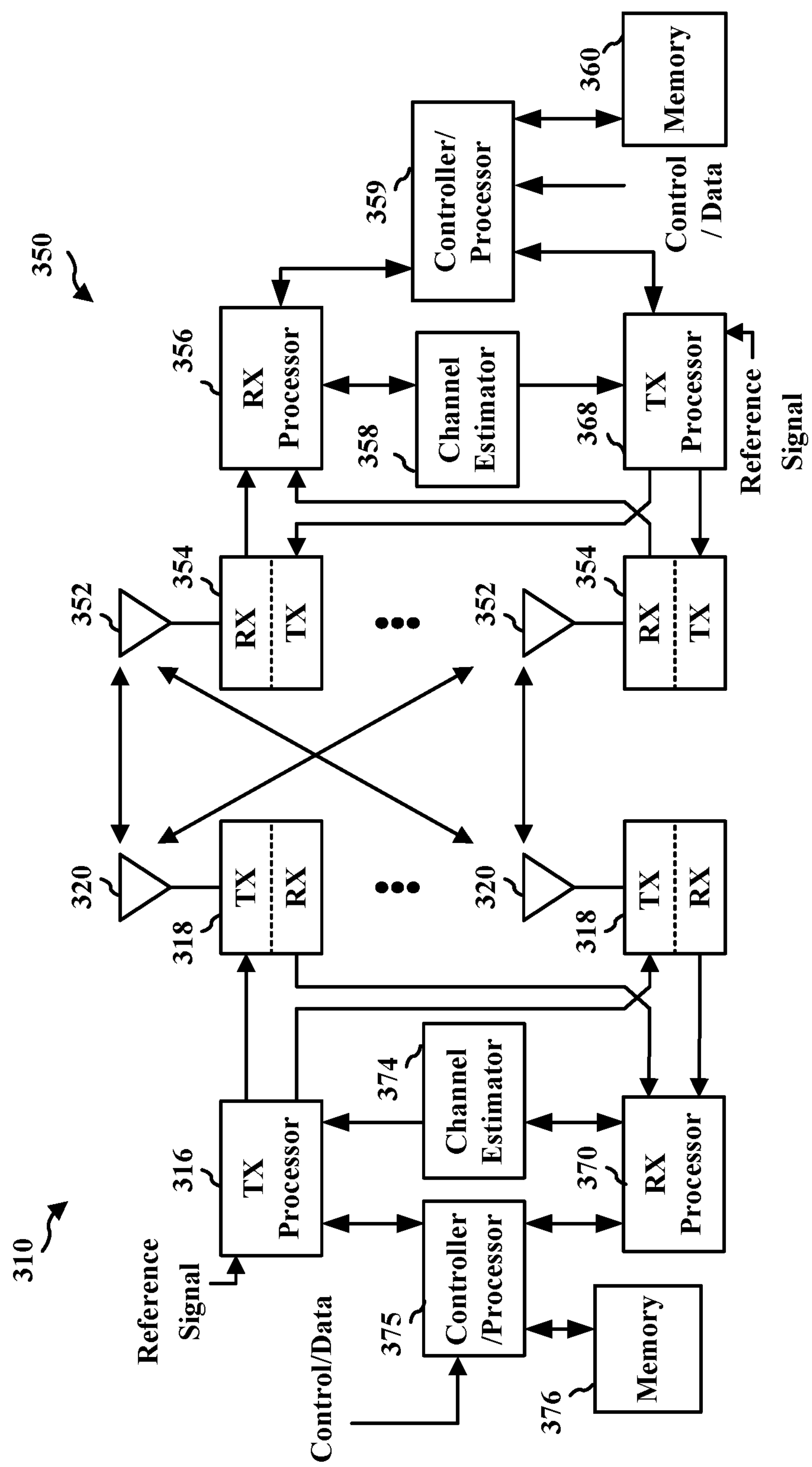
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 may convert the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the PUCCH resource set determination part 199 of FIG. 1.

At least one of the TX processor 316, the RX processor 370, and the controller/processor 375 may be configured to perform aspects in connection with the scheduling part 198 of FIG. 1.

FIG. 4 is a table 400 illustrating example configured PUCCH resource sets. The table 400 may be stored in a memory of a UE, such as the memory 360 of the UE 350. The UE may use the table 400 to generate and transmit a scheduled PUCCH transmission. Each row corresponds to one configured PUCCH resource set and includes the PUCCH resources for transmissions based on that configured PUCCH resource set. A configured PUCCH resource set includes a value for the PUCCH format, a value for the location of the first symbol of the PUCCH, a value for the number of symbols for the PUCCH, a value for the physical resource block (PRB) offset for the resource block (RB) for the PUCCH, and a set of possible values for the initial cyclic shift index.

For example, a PUCCH transmission sent using the configured PUCCH resource set described in the third row (such as the row with Index=2) has PUCCH format zero. It begins on the twelfth symbol of the uplink sub frame, has a symbol length of two. It will be in the fourth, fifth, or sixth resource block based on a PUCCH resource index, discussed infra. The PUCCH transmission can have an initial cyclic shift index of zero, four, or eight.

The UE may use a PUCCH resource set index, a PUCCH resource indicator (PRI), and a PRI location with the table 400 to determine when and how to send the PUCCH transmission. A base station may send the PUCCH resource set index to the UE in a radio resource control (RRC) message. The base station may send the PRI to the UE in a PDCCH transmission, and the position of the PRI in the received PDCCH may be the PRI location.

The UE may generate a PUCCH resource index based on the PRI and the PRI location. The PUCCH resource index may be an integer from 0-15. The PUCCH resource index may be equal to: $\lfloor(2*n_{CCE,0})/N_{CCE}\rfloor+2*\text{deltaPRI}$, where NCCE is a number of CCEs in a CORESET of a PDCCH reception with DCI format 1_0 or DCI format 1_1, $n_{CCE,0}$ is the index of a first CCE for the PDCCH reception, and deltaPRI is a value of the PUCCH resource indicator field in the DCI format 1_0 or DCI format 1_1.

The UE uses the PUCCH resource set identified in the row with an index value corresponding to the PUCCH resource set index. The UE selects a PRB based on the PUCCH resource index. If the resource index is seven or lower, a first hopping pattern is used. If the resource index is eight or higher, a second hopping pattern is used. The first hopping pattern has first hop RB counted from the lower end of the bandwidth and a second hop RB counted from the higher end in the bandwidth. The second hopping pattern has the reverse counting. Given the hopping pattern, the PRB is determined by the PRB offset and the ceiling of the resource index divided by the size of the cyclic shift stage.

The UE also uses the PUCCH resource index to select an initial cyclic shift index from the set of initial cyclic shift indices. Each value of the PUCCH resource index may correspond to one value in the set, and the UE may select the value corresponding to the PUCCH resource index as the initial cyclic shift index. For example, the UE may find the modulus of the PUCCH resource index divided by the number of initial cyclic shift indices in the set and may use the value at that position in the set as the initial cyclic shift index. Finally, the UE encodes the data to be transmitted based on the PUCCH format and the initial cyclic shift index and transmits the encoded information on the resources identified for the PUCCH.

In some aspects, the PUCCH resources that a UE is scheduled to transmit on may include an interlace. For example, a UE operating under the NR-unlicensed (NR-U) communication standard may transmit uplink control information on interlaces. Interlaces are discussed in more detail infra with respect to FIGS. 11A-B. As interlaces are repeated throughout the bandwidth allocated for PUCCH resources, and do not allow for frequency hopping, a base station scheduling UEs to transmit on interlaces may have fewer resources available for multiplexing different UEs than a base station scheduling to specific PRBs.

Figure 5:
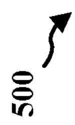
FIG. 5 is a table illustrating example configured PUCCH resource sets for PUCCH transmissions encoded with a time-division orthogonal cover code.

FIG. 5 is a table 500 illustrating example configured PUCCH resource sets for PUCCH transmissions encoded with a time-division orthogonal cover code (TD-OCC). Each configured PUCCH resource set may include a TD-OCC or a set of TD-OCCs. A UE sending a PUCCH transmission may encode the data for the transmission based on the value of the TD-OCC. For example, where the TD-OCC for a transmission is [1,−1], the UE may encode a sequence in a first symbol and may encode the negative of the sequence in the second symbol.

In some aspects, the table 500 may include configured PUCCH resource sets having different TD-OCCs. For example, as shown in FIG. 5, the configured PUCCH resource set for index 1 has a TD-OCC of [1,1] and the configured PUCCH resource set for index 2 has a TD-OCC of [1,−1]. A UE scheduled to send a PUCCH transmission may select a configured PUCCH resource set based on the PUCCH resource set index, may encode its data based on the initial cyclic shift index and the TD-OCC for the selected PUCCH resource set, and may transmit the encoded data on the PUCCH resources identified by the PUCCH resource set. A first UE may use the PUCCH resource set for index 1 and a second UE may use the PUCCH resource set for index 2, which may result in their PUCCH transmissions being multiplexed onto the same symbols.

In some aspects, a configured PUCCH resource set may have a set of TD-OCCs. For example, as shown in FIG. 5, the configured PUCCH resource set for index 0 has a set of TD-OCCs: [1,1] and [1,−1]. A UE generating a PUCCH transmission based on the configured PUCCH resource set for index 0 may determine which TD-OCC to use based on the PUCCH resource index. In some aspects, the UE may select the TD-OCC in the position in the set corresponding to the modulus of the PUCCH resource index divided by the number of TD-OCCs in the set. For example, where the set includes two TD-OCCs, the UE may select the first TD-OCC if the PUCCH resource index is zero or is even, and may select the second TD-OCC if the PUCCH resource index is odd. The UE may encode its data based on the selected TD-OCC and transmit the encoded data on the interlace identified in the configured PUCCH resource set.

In some aspects, the configured PUCCH resource sets for indexes 3, 7 and 11 may include a set of TD-OCCs including [1,1] and [1,−1]. The base station and the UE may determine the position in the set based on the PUCCH resource index. For example, a PUCCH resource index of ten or more may correspond to the TD-OCC of [1,−1], and a PUCCH resource index lower than ten may correspond to the TD-OCC of [1,1]. The configured PUCCH resource sets for indexes 1-2, 4-6, 8-10, and 12-15 may correspond to a TD-OCC of [1,1].

FIG. 6 is a table 600 illustrating example configured PUCCH resource sets for PUCCH transmissions with varied cyclic shifts. The table 600 includes configured PUCCH resources having sets of initial cyclic shift indices. In some aspects, two or more of the configured PUCCH resource sets may have sets of initial cyclic shift indices with no values in common. For example, as shown in FIG. 6, the PUCCH resource set for index 4 may have zero, three, six, and nine in its set of initial cyclic shift indices, the PUCCH resource set for index 5 may have one, four, seven, and ten in its set of initial cyclic shift indices, and the PUCCH resource set for index 6 may have two, five, eight, and eleven in its set of initial cyclic shift indices. A base station scheduling a first and second UE may schedule the first UE to use the configured PUCCH resource set for index 5 and may schedule the second UE to use the configured PUCCH resource set for index 6. The base station may distinguish between PUCCH transmission from the first UE and the second UE based at least in part on the cyclic shift of the transmission.

FIG. 7 is a table 700 illustrating example configured PUCCH resources sets for PUCCH transmissions encoded with a cyclic shift step size. A base station scheduling UEs to transmit uplink control information on PUCCH resources may schedule different UEs to transmit on the same interlaces at the same time with different cyclic shift step sizes and may, upon receiving the PUCCH transmissions, distinguish a transmission from a given UE based on the cyclic shift step size used by the UE.

In some aspects, the table 700 may include configured PUCCH resource sets having different cyclic shift step sizes. For example, as shown in FIG. 7, the configured PUCCH resource set for index 1 has a cyclic shift step size of one and the configured PUCCH resource set for index 2 has a cyclic shift step size of seven. A base station scheduling a UE may assign a cyclic shift step size to the UE and may set the PUCCH resource set index to a value corresponding to a configured PUCCH resource set having the assigned cyclic shift step size. The UE may receive the PUCCH resource set index from the base station, may determine the assigned cyclic shift step size based on the PUCCH resource set index, and may encode and transmit its uplink control information on the PUCCH resources based on the assigned cyclic shift step size. Finally, the base station may receive the transmitted uplink control information and associated it with the UE based, in part, on the cyclic shift step size (such as it may distinguish the uplink control information for the UE from uplink control information of a different UE transmitting on the same resources with a different cyclic shift step).

In some aspects, a configured PUCCH resource set may have a set of cyclic shift step size options. For example, as shown in FIG. 7, the configured PUCCH resource set for index 0 has a set of step size options: one and seven. A base station scheduling a UE may assign a cyclic shift step size to the UE, and may set the PUCCH resource set index, the PRI, and the PRI location to values corresponding to the assigned cyclic shift step size. The UE may receive the PUCCH resource set index, the PRI, and the PRI location, and generate the PUCCH resource index based on the PRI and the PRI location. The PUCCH resource set index may correspond to a PUCCH resource set having a set of cyclic shift step size options. The PUCCH resource index may correspond to the position in the PUCCH resource set where the assigned cyclic shift step size is located. The UE may encode and transmit its uplink control information on the PUCCH resources based on the assigned cyclic shift step size, and the base station may receive the transmitted uplink control information and associate it with the UE based on the cyclic shift step size.

FIGS. 8A and 8B are tables 800, 810 illustrating example configured PUCCH resource sets for PUCCH transmissions to be transmitted on varied symbols. Each configured PUCCH resource set may include a number of symbols and a first symbol or a set of first symbols. A first symbol also may be referred to as a start symbol. A UE sending a PUCCH transmission may transmit uplink control information, on symbols of an interlace specified by the PUCCH resource set, during a block of symbols having a length corresponding to the number of symbols and beginning at a symbol corresponding to the first symbol (such as where the first symbol is eight and the number of symbols is six, the UE may transmit during the eighth symbol of the interlace and the following five symbols: nine, ten, eleven, twelve, and thirteen).

In some aspects, such as illustrated in the table 800 of FIG. 8A, the table 800 may include configured PUCCH resource sets having different first symbol and number of symbol combinations. The table 800 may include configured PUCCH resource sets having a first symbol of twelve and a number of symbols of two; a first symbol of ten and a number of symbols of four; a first symbol of four and a number of symbols of ten; and a first symbol of zero and a number of symbols of fourteen. In addition, the table 800 also may include configured PUCCH resource sets having a first symbol of six and a number of symbols of eight; a first symbol of eight and a number of symbols of six; and a first symbol of two and a number of symbols of twelve.

In some aspects, such as illustrated in the table 810 of FIG. 8B, the table 810 may include PUCCH resource sets having mutually exclusive symbols. For example, in some aspects, the table 810 may include a configured PUCCH resource set for index 3 having a first symbol of four and a number of symbols of four; and a configured PUCCH resource set for index 4 having a first symbol of ten and a number of symbols of four. Thus, the PUCCH resource set for index 3 corresponds to symbols four, five, six, and seven and the PUCCH resource set for index 4 corresponds to symbols ten, eleven, twelve, and thirteen. In this example, the PUCCH resource set for index 3 and the PUCCH resource set for index 4 have mutually exclusive symbols. As another example, in some other aspects, the table 810 may include configured PUCCH resource sets having a first symbol of two and a number of symbols of two; a first symbol of six and a number of symbols of two; and a first symbol of ten and a number of symbols of two, such as the PUCCH resource sets for index 5, index 6, and index 7, respectively.

In some aspects, a table may include a configured PUCCH resource set having a set of first symbol options. For example, as shown in FIG. 8A, the configured PUCCH resource set for index 0 has a set of first symbol values including four and zero. As another example, as shown in FIG. 8B, the configured PUCCH resource sets for index 0, index 1, and index 2 each have a set of first symbol values including nine and twelve.

In some aspects, a configured PUCCH resource set includes a set of first symbol options and has a number of symbols value configured such that a first transmission on the symbols corresponding to one of the first symbol options and a second transmission on symbols corresponding to another of the first symbol options will not include overlapping symbols. In some aspects, the first transmission and the second transmission also may include a listen-before-talk (LBT) gap between the corresponding symbols. For example, a first UE using the PUCCH resource set for index 0 of the table 800 of FIG. 8A may be scheduled to transmit using one first symbol option (four) and a second UE using the PUCCH resource set for index 0 may be scheduled to transmit using the other first symbol option (ten). The first UE may transmit during symbols four, five, six, and seven of the interlace, and the second UE may transmit during symbols ten, eleven, twelve, and thirteen of the interlace. Symbols eight and nine of the interlace may serve as an LBT gap between the transmission of the first and second UEs.

In some aspects, a base station scheduling a UE may assign a first symbol to the UE, and may set the PUCCH resource set index, the PRI, and the PRI location to values corresponding to the assigned first symbol. The UE may receive the PUCCH resource set index, the PRI, and the PRI location, and generate the PUCCH resource index based on the PRI and the PRI location. The PUCCH resource set index may correspond to a PUCCH resource set having a set of first symbol options. The PUCCH resource index may correspond to the position in the PUCCH resource set where the assigned first symbol is located. The UE may encode and transmit its uplink control information on the PUCCH at the symbols corresponding to the assigned first symbol and the number of symbols, and the base station may receive the transmitted uplink control information at those symbols and associate it with the UE.

In some aspects, such as illustrated in the table 810 of FIG. 8B, the configured PUCCH resource set for index 0 may have a set of first symbol values including nine and twelve. PUCCH resource index values of ten or higher may correspond to the first symbol of nine, and PUCCH resource index values lower than ten may correspond to the first symbol value of twelve. In some aspects, the configured PUCCH resource set for index 1 or the configured PUCCH resource set for index 2 may have a set of first symbol values including nine and twelve. A PUCCH resource index values of fifteen may correspond to the first symbol of nine, and other PUCCH resource index values (such as zero to fourteen) may correspond to the first symbol value of twelve. The configured PUCCH resource sets having a set of first symbols values including nine and twelve may include a number of symbols value of two, such that a transmission using the first symbol value of nine (such as a transmission on the symbols corresponding to nine and ten) does not include symbols in common with a transmission using the second symbol value of twelve (such as a transmission on the symbols corresponding to twelve and thirteen).

Different aspects of configured PUCCH resource sets described above may provide different resources for a base station to utilize in scheduling a PUCCH for a UE, including TD-OCCs, sets of TD-OCCs, sets of initial cyclic shift indices, cyclic shift step sizes, sets of cyclic shift step sizes, first symbol and number of symbol combinations, and sets of first symbols. In some aspects, some or all of the above aspects may be incorporated into a single PUCCH resource set. For example, a first configured PUCCH resource set may include a set of TD-OCCs, a set of initial cyclic shift indices, and a set of cyclic shift step sizes.

Figure 9:
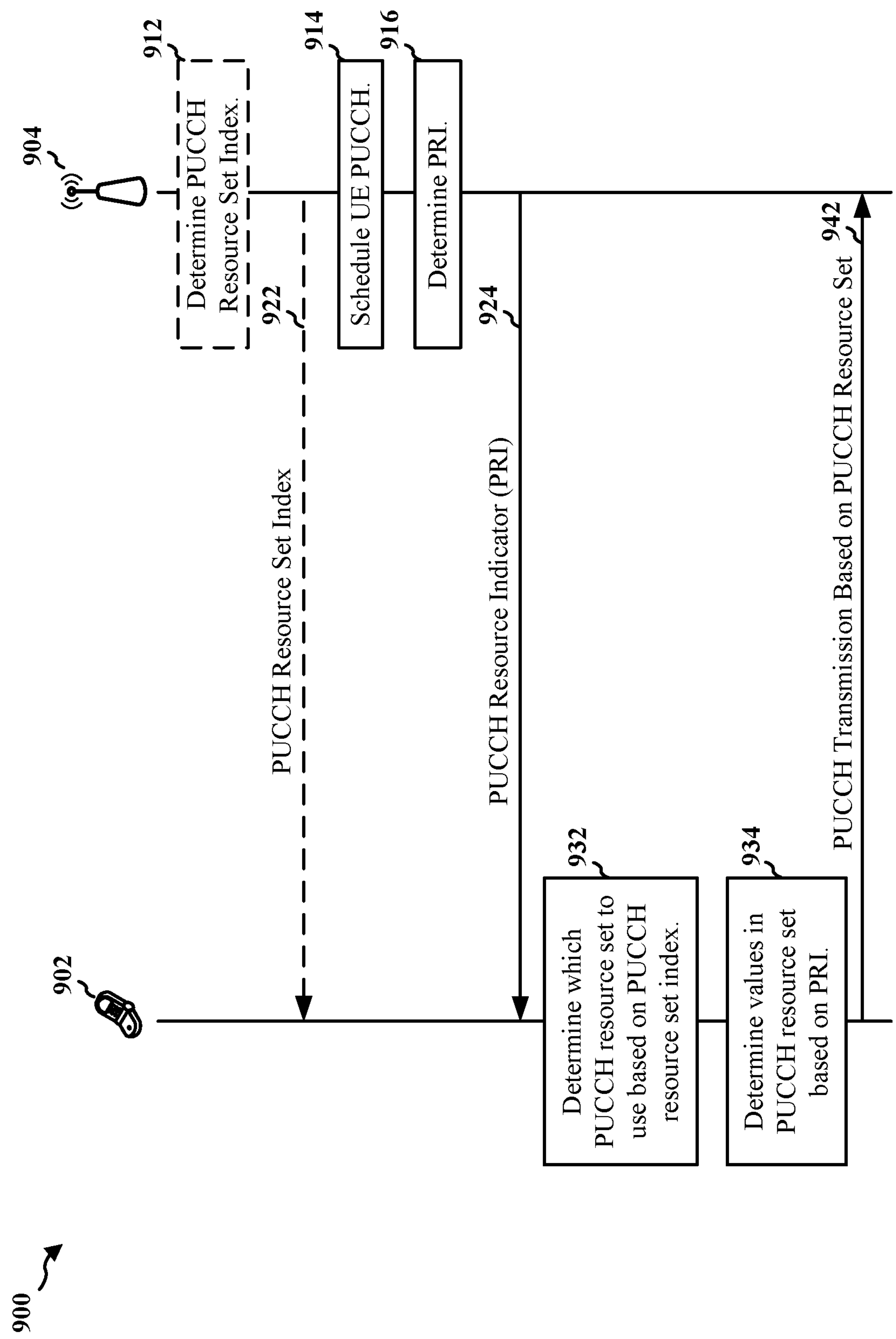
FIG. 9 is a communication diagram illustrating example scheduling communication between a UE and a base station.

FIG. 9 is a communication diagram 900 illustrating example scheduling communication between a UE 902 and a base station (BS) 904.

In some aspects, the base station 904 may initially determine a PUCCH resource set index as illustrated at 912. In some aspects, the base station 904 may transmit the PUCCH resource set index 922 to the UE 902, and the UE 902 may store the PUCCH resource set index 922. The base station 904 may transmit the PUCCH resource set index 922 to the UE 902 in a radio resource control (RRC) message.

The base station 904 may schedule a PUCCH for the UE 902 as illustrated at 914. The scheduling may involve determining which RB s/symbols the UE 902 will use to transmit its uplink control information and how the uplink control information will be encoded. In some aspects, the base station 904 may schedule the PUCCH for the UE 902 based on the PUCCH resource set index 922. For example, the base station 904 may account for the different resources available to a UE utilizing the PUCCH resource set index 922 (such as the PUCCH resource set index 922 may identify a PUCCH resource set which includes a set of cyclic shift step sizes, and the base station 904 may take into account that the UE 902 may be scheduled using one of those cyclic shift step sizes when scheduling the UE 902).

In some aspects, the base station 904 may schedule the PUCCH of the UE 902 prior to transmitting the PUCCH resource set index 922 to the UE, which may allow the base station 904 more options in scheduling the UE 902. In some aspects, the base station 904 may transmit the PUCCH resource set index 922 to the UE 902 prior to scheduling the PUCCH of the UE 902, may determine to change the PUCCH resource set index during scheduling the PUCCH of the UE 902, and may transmit a new PUCCH resource set index to the UE 902.

The base station 904 may determine a PRI for the UE 902, as illustrated at 916, and may transmit the PRI 924 to the UE 902 on a PDCCH transmission. The base station 904 may determine the value of the PRI 924 and the location of the PRI 924 on the PDCCH (hereinafter 'the PRI location') such that the UE 902, upon generating a PUCCH resource index from the PRI and the PRI location, will be able to determine its scheduled PUCCH resources.

The UE may determine which PUCCH resource set to use based on the PUCCH resource set index, as illustrated at 932. For example, as discussed above, the UE 902 may include configured PUCCH resource sets associated with index values (such as in a table with one row per index value). The UE 902 may determine to use the configured PUCCH resource set associated with an index corresponding to the PUCCH resource set index 922.

The UE 902 may determine the values in the configured PUCCH resource set determined at 932 based on the PRI and the PRI location, as illustrated at 934. The configured PUCCH resource set may include one or more set of values. The UE 902 may generate a PUCCH resource index based on the PRI and the location of the PRI. In some aspects, the PUCCH resource index may have a value for each possible configuration of the configured PUCCH resource set. In some aspects, the PUCCH resource index may have an integer value of or between zero and fifteen, and the configured PUCCH resource set may include sixteen different configurable resource sets. The In some aspects, the PUCCH resource index may have a larger number of possible values that the configured PUCCH resource index has possible configurations. For example, the PUCCH resource index may have an integer value of or between zero and fifteen, and the configured PUCCH resource set may have fourteen possible configurable resource sets. In such a case, the first values of the PUCCH resource index may map to the possible configurable resource sets (for example, zero to thirteen can be mapped to the fourteen configurable resource sets). In some aspects, the remaining values (such as fourteen and fifteen) of the PUCCH resource index may be invalid and the base station 904 may not send them to the UE 902. In some aspects, the remaining values of the PUCCH resource index may wrap around and map to previously mapped configurable resource sets (such as zero and fourteen being mapped to the first configurable resource set, with one and fifteen being mapped to the second configurable resource set).

Finally, the UE 902 may transmit a PUCCH transmission 942 based on the determined PUCCH resource set. The determined PUCCH resource set may include PUCCH resources on which the UE 902 can make the transmission and may include values for encoding the uplink control information transmitted (such as for multiplexing purposes). The UE 902 may encode and transmit its uplink control information according to the determined PUCCH resource set.

Figures 10A, 10B, 10C:
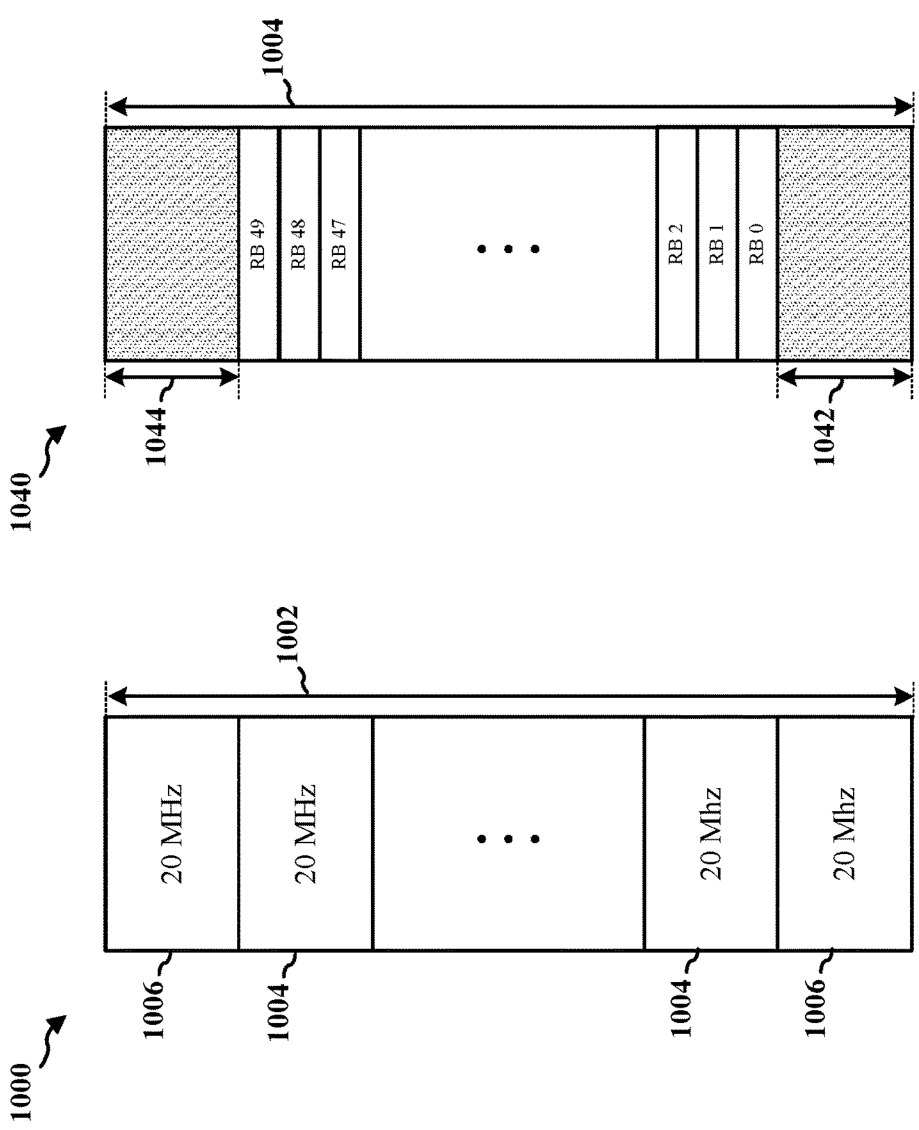
FIG. 10A is a diagram illustrating an example bandwidth part.
FIG. 10B is a diagram of an example central sub-band.
FIG. 10C is a diagram of an example end sub-band.

FIG. 10A is a diagram 1000 illustrating an example bandwidth part 1002. The bandwidth part 1002 may be a wideband bandwidth part and may include some or all of an unlicensed wireless communication spectrum. In some aspects, the bandwidth part may be some or all of the 5 GHz band.

The bandwidth part 1002 may be divided into sub-bands 1006 and 1004. For example, as shown in FIG. 10A, the bandwidth part 1002 may be split into 20 MHz sub-bands. Some of the sub-bands are central bands 1004, located toward the center of the bandwidth part 1002, and some of the sub-bands are end bands 1006, located at the edges of the bandwidth part 1002. Although FIG. 10A shows the sub-bands at the very edges of the bandwidth part 1002 as being end bands 1006, the present disclosure is not limited thereto. In some aspects, several of the outermost sub-bands may be end bands 1006.

FIG. 10B is a diagram 1040 of an example central band 1004 and FIG. 10C is a diagram 1060 of an example end band 1006. The central bands 1004 and the end bands 1006 may include left guard bands 1042 and 1062, right guard bands 1044 and 1064, and RBs. The guard bands may have a minimum bandwidth. For example, the left guard bands 1042 and 1062 may have a 925 kHz minimum bandwidth and the right guard bands 1044 and 1064 may have a 1075 kHz minimum bandwidth.

The bandwidth part 1002 may have a common PRB grid over the entire bandwidth part, and the RBs belonging to a given sub-band may be the center-most RBs within that sub-band. That is, the RBs are defined relative to each other and to the bandwidth part 1002, not to the sub-band they fall within. Further, the number of RBs in the PRB may not be cleanly divisible by the number of sub-bands, so the RBs may not fit evenly into the respective sub-bands and may therefore be positioned slightly differently relative to their respective sub-bands.

In some aspects, the RBs in an end band 1006 may be oriented such that fewer RBs can fit between the left guard band 1062 and the right guard band 1064 of the end band 1006 than can fit between the left guard band 1042 and the right guard band 1044 of the central band 1004. For example, the first RB (RB 0) in a sub-band may be the first RB which begins outside the minimum for the left guard band. As shown in FIG. 10B, a central band 1004 may have 50 RBs (i.e., RB 0 through RB 49) between the left guard band 1042 and the right guard band 1044. As shown in FIG. 10C, the left guard band 1062 may overlap an RB, and that RB may therefore be excluded from the end band 1006. Accordingly, the end band 1006 may have 49 RBs (i.e., RB 0 through RB 48) between the left guard band 1062 and the right guard band 1064.

Figure 11B:
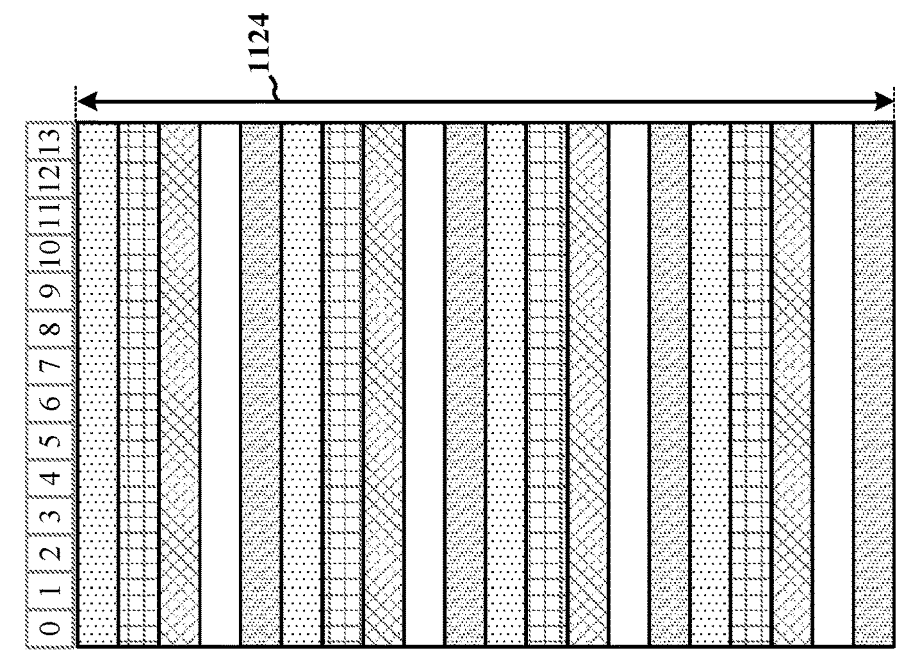
FIG. 11B is a diagram illustrating an example bandwidth of a sub-band which includes five interlaces.
Figure 11A:
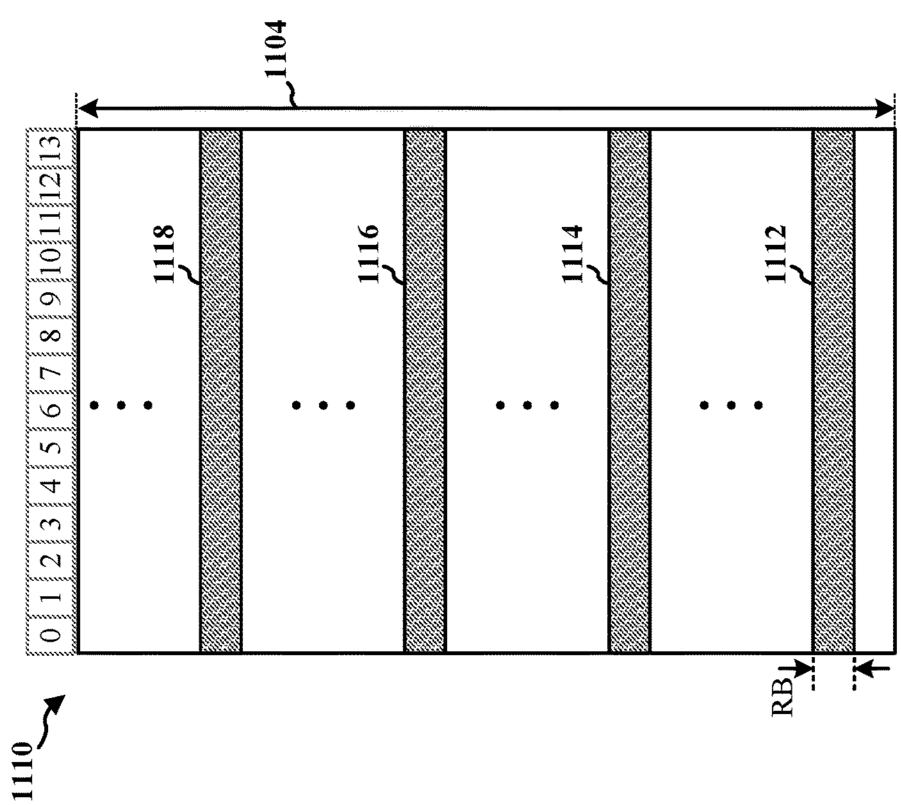
FIG. 11A is a diagram illustrating an example interlace.

FIG. 11A is a diagram 1110 illustrating an example interlace. An single interlace includes RBs spaced throughout the bandwidth 1104 of, for example, a sub-band. For example, the interlace illustrated in FIG. 11A includes a first RB 1112, a second RB 1114, a third RB 1116, a fourth RB 1118, etc. A UE sending a transmission, such as a wideband transmission, on an interlace may transmit on each RB of an interlace. Doing so many prevent interference or may increase the occupied channel bandwidth (OCB) of the transmission. In some aspects, the UE may transmit the same data, shifted by a cyclic shift value, on each RB.

FIG. 11B is a diagram 1120 illustrating an example bandwidth 1124 of a sub-band which includes five interlaces. There are four RBs belonging to other interlaces between each adjacent pair of interlaces in any given interlace. The pattern repeats for every RB in the bandwidth 1124.

Referring again to FIGS. 10A, 10B, and 10C, each sub band may be divided into an equal number of interlaces. For example, each sub-band may be divided into five interlaces. Because the central band 1004 has more RBs than and the end band 1006 but the central band 1004 and the end band 1006 have the same number of interlaces, the end band 1006 will have at least one interlace with fewer RBs than a corresponding interlace in a central band 1004 which did not lose an RB (hereinafter 'abbreviated interlace'), but will have other interlaces with the same number of RBs as a corresponding interlace in a central band 1004 (hereinafter 'non-abbreviated interlace'). For example, the 50 RBs of the central band 1004 may be divided into five interlaces having 10 RBs each, and the 49 RBs of the end band 1006 may be divided into four interlaces having 10 RBs each (non-abbreviated interlaces) and one interlace having nine RBs (abbreviated interlace).

In some aspects, a UE may be able to send a transmission (such as a PUCCH transmission) on a non-abbreviated interlace but may not be able to send a transmission on an abbreviated interlace. For example, a UE may want to send a PUCCH transmission with a minimum number of RBs and the abbreviated interlace may not have sufficient RBs (such as a PUCCH transmission may require 10 or more RBs, and an abbreviated interlace may have nine RBs.) For another example, a UE may want to send a PUCCH transmission with at least a minimum OCB, and the abbreviated interlace may have insufficient OCB (such as the PUCCH may require a minimum 80% OCB, the non-abbreviated interlace may have greater than 80% OCB, and the abbreviated interlace may have less than 80% OCB).

Figure 12:
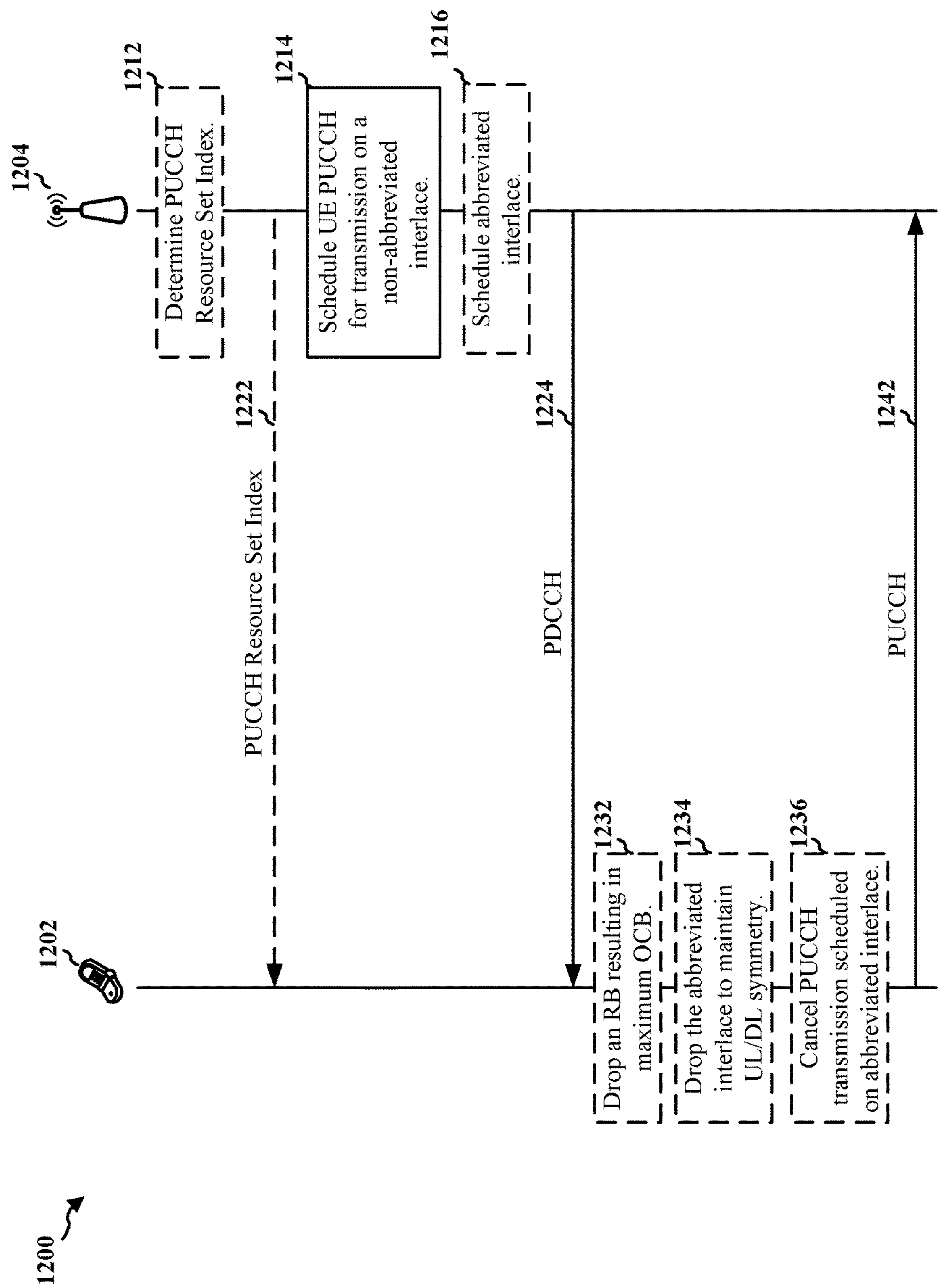
FIG. 12 is a communication diagram illustrating an example base station scheduling a UE for uplink transmission on a bandwidth part having reduced RBs.

FIG. 12 is a communication diagram 1200 illustrating an example base station 1204 scheduling a UE 1202 for uplink transmission on a bandwidth part having reduced RBs.

In some aspects, the base station 1204 may initially determine a PUCCH resource set index as illustrated at 1212. In some aspects, the base station 1204 may transmit the PUCCH resource set index 1222 to the UE 1202, and the UE 1202 may store the PUCCH resource set index 1222. The base station 1204 may transmit the PUCCH resource set index 1222 to the UE 1202 in a radio resource control (RRC) message. The base station 1204 may determine the PUCCH resource set index 1222 to have a value corresponding to a configured PUCCH resource set having an interlace index which corresponds to a non-abbreviated interlace. In some aspects, the base station 1204 may reject PUCCH resource set index values which correspond to transmission on an abbreviated interlace.

The base station 1204 may schedule a PUCCH for the UE 1202 as illustrated at 1214. The base station 1204 may schedule the PUCCH to be transmitted on a non-abbreviated interlace.

In some aspects, the base station 1204 may schedule the PUCCH to be transmitted on a non-abbreviated interlace and an abbreviated interlace as illustrated at 1216. For example, the base station 1204 may determine that the PUCCH may need additional bandwidth to transmit additional data, and may therefore schedule the PUCCH to be on two interlaces—a non-abbreviated interlace and an abbreviated interlace. While the abbreviated interlace may contain too few RBs or may have too small OCB on its own, a transmission sent on a non-abbreviated interlace and the abbreviated interlace may overcome both issues.

The base station 1204 may transmit a PDCCH transmission 1224 to the UE 1202. The UE 1202 may determine its scheduled resources based on the PDCCH transmission 1224.

In some aspects, the UE 1202 may determine that it must drop an RB from an interlace of its scheduled PUCCH transmission as illustrated at 1232. For example, where the UE 1202 is scheduled to transmit on interlaces utilizing discrete Fourier transform spread OFDM (DFT-s-OFDM), the UE 1202 may be able to send a transmission having a number of RBs equal to $(2^m)*(3^n)*(5^p)$ (where m, n, and p are non-negative integers. The scheduled interlaces may include too many RBs, so the UE 1202 may determine to drop enough RBs to set the transmission's RBs equal to $(2^m)*(3^n)*(5^p)$. The UE 1202 may drop an RB at an edge of the transmission (such as an RB corresponding to either the highest or the lowest frequency subcarrier). To determine whether to drop the RB at the highest frequency or the RB at the lowest frequency, the UE 1202 may determine which would result in the maximum OCB for the resultant transmission and may drop that RB.

For example, a given sub-band has 49 RBs, four interlaces with 10 RBs, and one abbreviated interlace with nine RBs. The base station 1204 may have scheduled the UE 1202 to transmit a PUCCH transmission on a non-abbreviated, 10 RB interlace and the abbreviated, nine RB interlace. The UE 1202 is therefore scheduled to transmit on 19 RBs, which is not equal to $(2^m)*(3^n)*(5^p)$. The non-abbreviated interlace may include RBs 1, 6, 11, . . . , 41, and 46; and the abbreviated interlace may include RBs 5, 10, . . . , 40, and 45. The UE 1202 determines to drop RB 1 or RB 46. If the UE 1202 drops RB 1, the resulting transmission spans RB 5 to RB 46, or 41 RBs. If the UE 1202 drops RB 46, the resulting transmission spans RB1 to RB 45, or 45 RBs. Accordingly, the UE 1202 drops RB 46 and the PUCCH transmission is on RBs 1, 5, 6, 10, 11, . . . , 45, and 46.

In some aspects, rather than selecting the RB which results in the maximum OCB as described above, the UE 1202 may instead compare the OCB of the resultant signal with a threshold OCB value and may approve of dropping any RB that does not reduce the OCB below the threshold.

In some aspects, the UE 1202 may drop the abbreviated interlace to maintain UL/DL symmetry as illustrated at 1234. The DL bandwidth part may have 48 RBs. The UL bandwidth part may have the same central frequency as the DL bandwidth part and the PRB of the UL bandwidth may be aligned with the PRB of the DL bandwidth to maintain symmetry. If the UL bandwidth part has 49 RBs and the DL bandwidth part has 48 RBs, they cannot have both the same central frequency and aligned PRBs. Accordingly, the UE may drop one more RB to bring the number of RBs in the UL bandwidth to 48. In some aspects, the base station 1204 may configure a 50 RB UL bandwidth part but include a guard band that will overlap one RB of the 50 RB UL bandwidth. Accordingly, symmetry may be achieved between a 48 RB DL bandwidth part and a 49 RB UL bandwidth part with one invalid RB.

In some aspects, the UE 1202 may expect the scheduled interlace to be a non-abbreviated interlace (such as an interlace having 10 or 11 RBs). As illustrated at 1236, in some aspects, the UE 1202 may cancel the transmission of a PUCCH scheduled to be transmitted on an abbreviated interlace (such as an interlace with 9 or fewer RBs).

Finally, the UE 1202 transmits uplink control information on the PUCCH 1242 to the base station 1204 (assuming the UE 1202 did not cancel the PUCCH transmission as illustrated at 1236).

Figure 13:
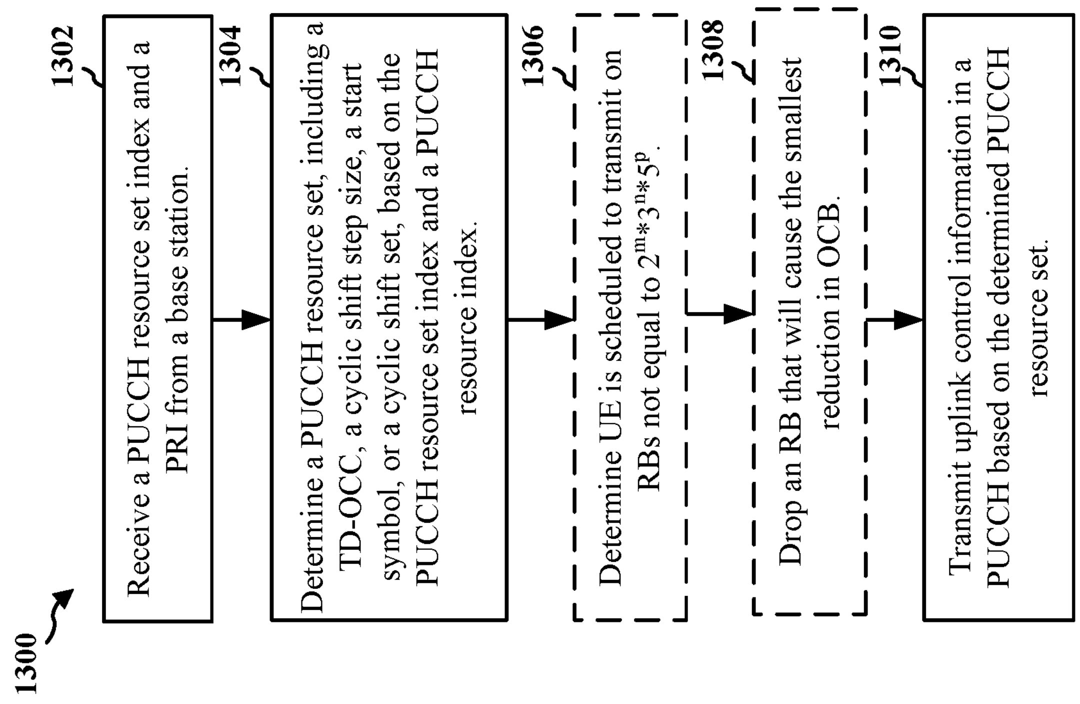
FIG. 13 is a flowchart of an example method of wireless communication.

FIG. 13 is a flowchart 1300 of an example method of wireless communication. The method may be performed by a UE (such as the UE 902; the apparatus 1402/1402'; the processing system 1514, which may include the memory 360 and which may be the entire UE 902 or a component of the UE 902, such as the TX processor 368, the RX processor 356, or the controller/processor 359).

At block 1302, the UE receives a physical uplink control channel (PUCCH) resource set index and a PUCCH resource indicator (PRI) from a base station, the PRI being received in a physical downlink control channel (PDCCH). For example, 1302 may be performed by the reception component 1404.

At block 1304, the UE determines a PUCCH resource set based on the PUCCH resource set index and a PUCCH resource index, the PUCCH resource index being based on the PRI and the PDCCH location carrying the PRI, where at least one of a time division orthogonal cover code (TD-OCC), a cyclic shift step size, a first symbol, or a cyclic shift set of the determined PUCCH resource set is determined based on the PUCCH resource set index or the PUCCH resource index. For example, 1304 may be performed by resource set determination component 1412.

The PUCCH resource set index may correspond to a configured PUCCH resource set having a set of TD-OCCs, where the TD-OCC of the determined PUCCH resource set is selected from the set of TD-OCCs based on the PUCCH resource index, and where the uplink control information is transmitted based on the TD-OCC of the determined PUCCH resource set. The PUCCH resource set index may correspond to a configured PUCCH resource set having a configured TD-OCC, where the TD-OCC of the determined PUCCH resource set is determined to be the configured TD-OCC, and where the uplink control information is transmitted based on the TD-OCC of the determined PUCCH resource set.

The UE may have a plurality of configured PUCCH resource sets having at least two cyclic shift sets, the two cyclic shift sets having no common values. The PUCCH resource set index may correspond to a configured PUCCH resource set of the plurality of configured PUCCH resource sets having a configured cyclic shift set that is one of the at least two cyclic shift sets having no common values. The cyclic shift set of the determined PUCCH resource set may be determined to be the configured cyclic shift set. The uplink control information may be transmitted based on the cyclic shift set of the determined PUCCH resource set. The at least two cyclic shift sets having no common values may include, for example, {0, 3, 6, 9} and {1, 4, 7, 10}.

The PUCCH resource set index may correspond to a configured PUCCH resource set having a set of step size options, where the step size of the determined PUCCH resource set is selected from the set of step size options based on the PUCCH resource index, and where the uplink control information is transmitted based on the step size of the determined PUCCH resource. The PUCCH resource set index may correspond to a configured PUCCH resource set having a configured step size, where the step size of the determined PUCCH resource set is determined to be the configured step size, and where the uplink control information is transmitted based on the step size of the determined PUCCH resource set.

The PUCCH resource set index may correspond to a configured PUCCH resource set having a set of first symbol options, where the first symbol of the determined PUCCH resource set is selected from the set of first symbol options based on the PUCCH resource index, and where the uplink control information is transmitted based on the first symbol of the determined PUCCH resource. The configured PUCCH resource set may have a configured number of symbols, and each first symbol of the set of first symbol options may be separated from the other first symbols of the set of first symbol options by at least a number of symbols equal to the configured number of symbols. The set of first symbol options may include four and ten, and where a configured number of symbols of the configured PUCCH resource set is four. Each first symbol of the set of first symbol options, in combination with a configured number of symbols of the configured PUCCH resource set, may provide a listen-before-talk or listen-before-transmit (LBT) symbol gap between PUCCH transmissions sent based on other first symbols in the set of first symbol options.

The UE may have a plurality of configured PUCCH resource sets having at least five distinct values for a first symbol, the PUCCH resource set index may correspond to a configured PUCCH resource set of the plurality of configured PUCCH resource sets having a configured first symbol having one of the at least five distinct values for a first symbol, the first symbol of the determined PUCCH resource set may be determined to be the configured first symbol, and the uplink control information may be transmitted based on the first symbol of the determined PUCCH resource set. In some implementations, the at least five distinct values for a first symbol may include zero, four, ten, twelve, and at least one of six, eight, and two. The PUCCH resource set may include an interlace index and the UE may transmit the uplink control information in the PUCCH based on the interlace index.

The PUCCH resource set may include an interlace index and the UE may transmits the uplink control information in the PUCCH based on the interlace index.

The TD-OCC, the cyclic shift step size, the first symbol, and the cyclic shift set of the determined PUCCH resource set may be determined based on the PUCCH resource set index or the PUCCH resource index.

The parameters of the PUCCH resource set may provide X possible resource combinations, the PUCCH resource index may have X+N possible values, the first X PUCCH resource indices may be mapped to corresponding resource combinations, and determining the PUCCH resource set based on the PUCCH resource index may be receiving a PUCCH resource index having a value K greater than X+1 and determining the PUCCH resource set based on the resource combination corresponding to the Kth PUCCH resource index.

At block 1310, the UE transmits uplink control information in a PUCCH based on the determined PUCCH resource set. For example, 1310 may be performed by PUCCH transmission component 1414.

In some aspects, a bandwidth part may include non-abbreviated interlaces and abbreviated interlaces. The determining the PUCCH resource set based on the PUCCH resource set index and the PUCCH resource index may include determining a PUCCH resource set corresponding to a non-abbreviated interlace, and the transmitting uplink control information in the PUCCH based on the determined PUCCH resource set may include transmitting the uplink control information on a non-abbreviated interlace of the bandwidth part. The abbreviated interlaces may include nine or fewer resource blocks (RBs) and the non-abbreviated interlaces may include ten or more RBs. The bandwidth part may include five interlaces, one interlace of the five interlaces being an abbreviated interlace, and four of the five interlaces being non-abbreviated interlaces. An abbreviated interlace may be an interlace that includes a resource block that overlaps with a guard band, and a non-abbreviated interlace may be an interlace that does not include the resource block that overlaps with the guard band. The transmitting uplink control information in the PUCCH based on the determined PUCCH resource set may include transmitting the uplink control information on a non-abbreviated interlace and an abbreviated interlace of the bandwidth part.

In some aspects, at block 1306, the UE may determine that it is scheduled to transmit on R RBs, R not being equal to $(2^m)*(3^n)*(5^p)$, where R, m, n, and p are all positive integers. At block 1308, The UE may determine to drop an RB of the R RBs that will cause the smallest reduction in occupied channel bandwidth.

Figure 14:
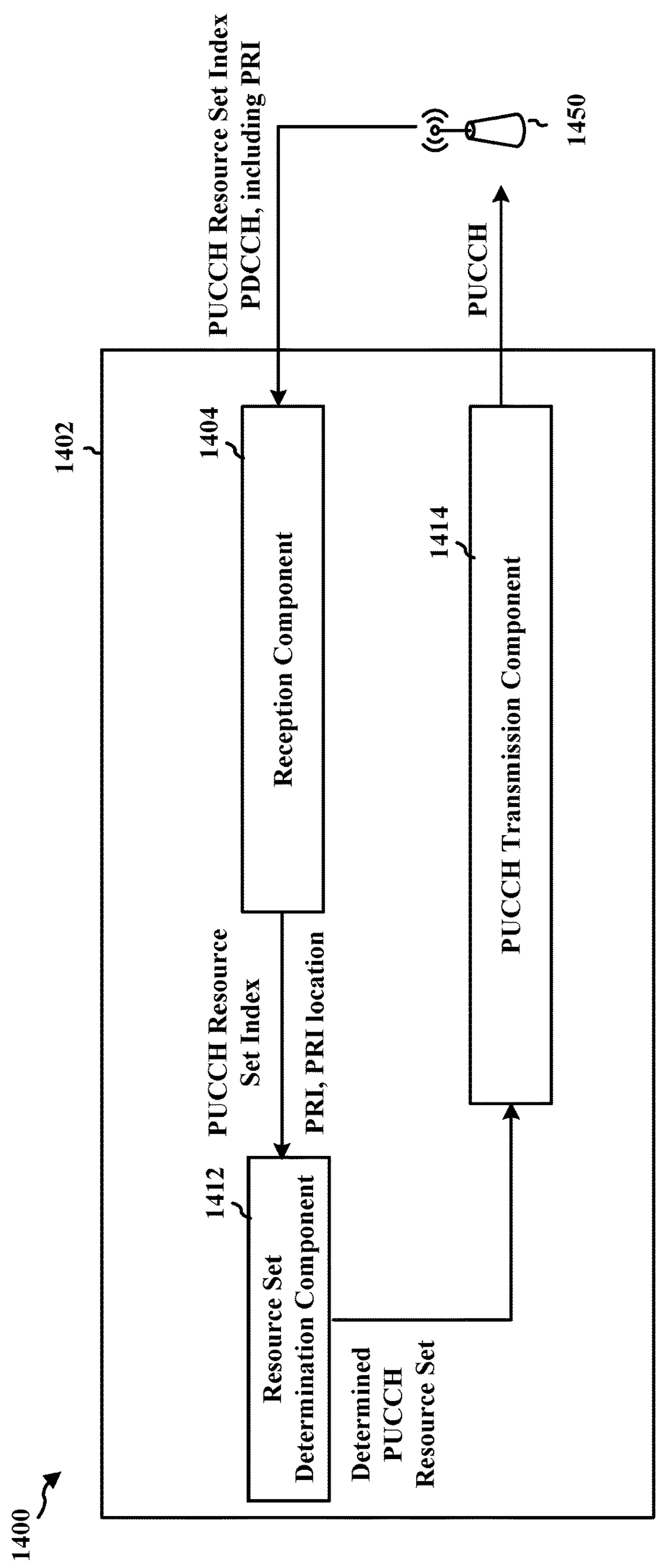
FIG. 14 is a conceptual data flow diagram illustrating an example data flow between different means/components in an example apparatus.

FIG. 14 is a conceptual data flow diagram 1400 illustrating an example data flow between different means/components in an example apparatus 1402. The apparatus may be a UE, as described throughout. The apparatus includes a reception component 1404 that receives a PUCCH resource set index and a PDCCH, including a PRI at a PRI location, from a base station 1450, such as described in connection with 1302. The apparatus includes a resource set determination component 1412 that receives the PUCCH resource set index, the PRI, and the PRI location, and determines a PUCCH resource set including a TD-OCC, a cyclic shift step size, a first symbol, or a cyclic shift set, such as described in connection with 1304. The apparatus includes a PUCCH transmission component 1414 that receives the determined PUCCH resource set and generates a PUCCH transmission based on the PUCCH resource set, such as described in connection with 1310.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
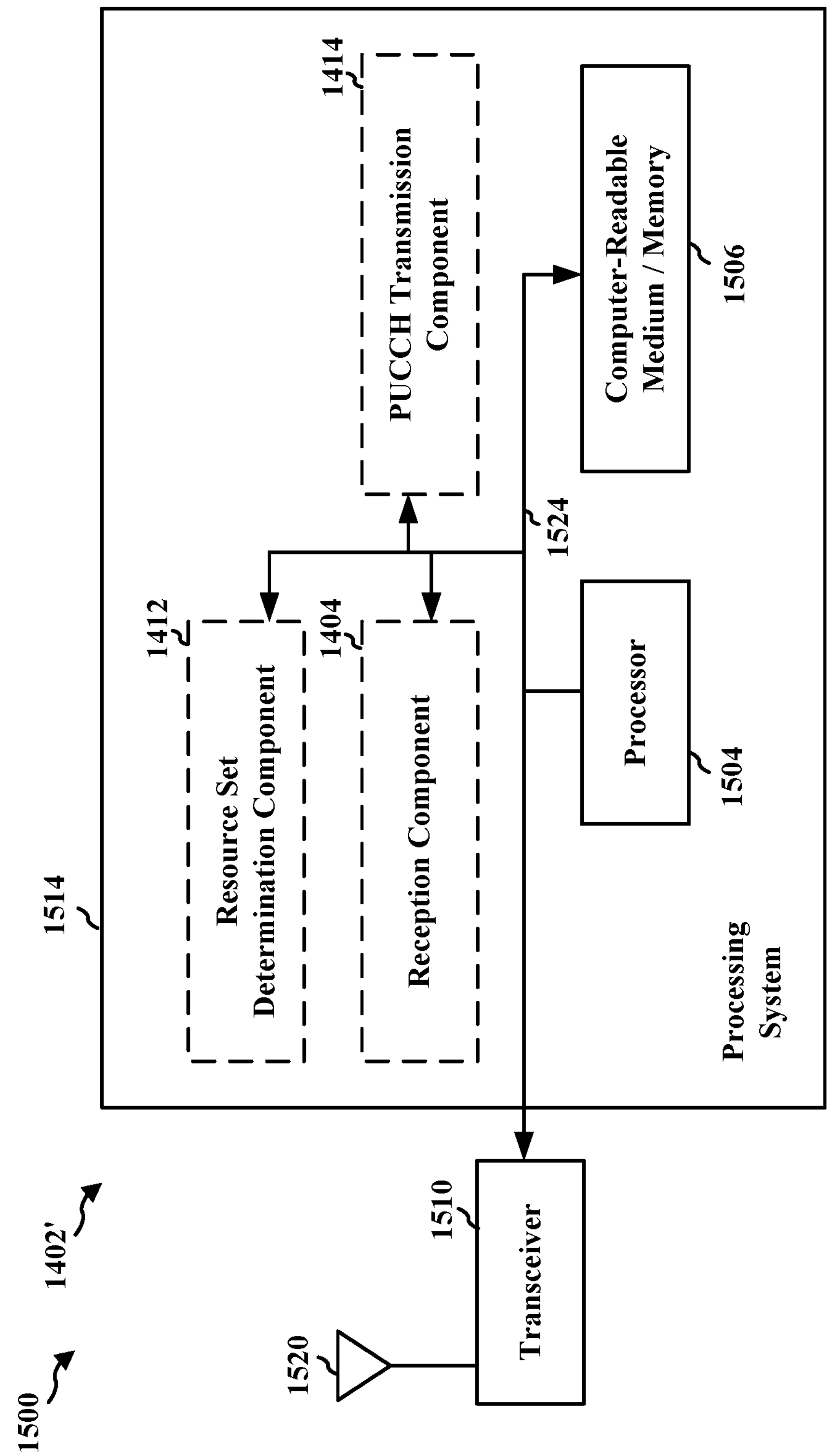
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors or hardware components, represented by the processor 1504, the components 1404, 1412, 1414, and the computer-readable medium/memory 1506. The bus 1524 also may link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the PUCCH transmission component 1414, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described above for any particular apparatus. The computer-readable medium/memory 1506 also may be used for storing data that is manipulated by the processor 1504 when executing software. The processing system 1514 further includes at least one of the components 1404, 1412, 1414. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 or at least one of the TX processor 368, the RX processor 356, and the controller/processor 359. Alternatively, the processing system 1514 may be the entire UE (such as the UE 350 of FIG. 3).

In some implementations, the apparatus 1402/1402' for wireless communication includes means for receiving a PUCCH resource set index and a PRI from a base station, means for determining a PUCH resource set, including a TD-OCC, a cyclic shift step size, a first symbol, or a cyclic shift set, based on the PUCCH resource set index and a PUCCH resource index, and means for transmitting uplink control information in a PUCCH based on the determined PUCCH resource set. The aforementioned means may be one or more of the aforementioned components of the apparatus 1402 or the processing system 1514 of the apparatus 1402' configured to perform the functions recited by the aforementioned means. As described, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
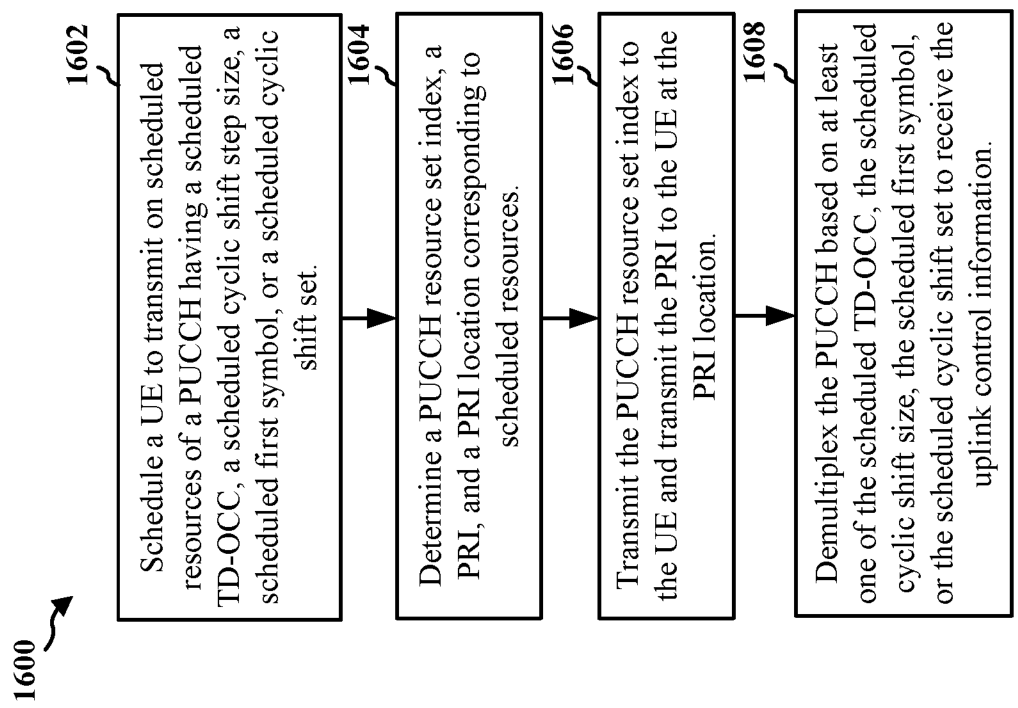
FIG. 16 is a flowchart of an example method of wireless communication.

FIG. 16 is a flowchart 1600 of an example method of wireless communication. The method may be performed by a base station 904 (such as the base station 904; the apparatus 1702/1702'; the processing system 1814, which may include the memory 376 and which may be the entire base station 904 or a component of the base station 904, such as the TX processor 316, the RX processor 370, or the controller/processor 375).

At block 1602, the base station schedules a UE to transmit uplink control information on scheduled resources of a PUCCH, the scheduled resources having at least one of a scheduled TD-OCC, a scheduled cyclic shift step size, a scheduled first symbol, or a scheduled cyclic shift set. For example, 1602 may be performed by the scheduling component 1712.

At block 1604, the base station determines a PUCCH resource set index, a PRI, and a PDCCH location for the PRI corresponding to the scheduled resources of the PUCCH. For example, 1604 may be performed by the resource set determination component 1714 depicted in FIG. 17.

The PUCCH resource set index may correspond to a configured PUCCH resource set having a set of TD-OCCs. The set of TD-OCCs may include the scheduled TD-OCC, and the PRI and the location of the PRI on the PDCCH may correspond to a position of the scheduled TD-OCC in the set of TD-OCCs.

The UE may have a plurality of configured PUCCH resource sets having at least two cyclic shift sets, the two cyclic shift sets having no common values. The PUCCH resource set index may correspond to a configured PUCCH resource set of the plurality of configured PUCCH resource sets having a configured cyclic shift set that is one of the at least two cyclic shift sets having no common values. The configured cyclic shift set may be the scheduled cyclic shift set.

The PUCCH resource set index may correspond to a configured PUCCH resource set having a set of cyclic shift step size options, the set of cyclic shift step size options including the scheduled cyclic shift step size, and the PRI and the location of the PRI on the PDCCH may correspond to a position of the scheduled cyclic shift step size in the set of cyclic shift step size options.

The PUCCH resource set index may correspond to a configured PUCCH resource set having a set of first symbol options, the set of first symbol options including the scheduled first symbol. The PRI and the location of the PRI on the PDCCH may correspond to a position of the scheduled first symbol in the set of first symbol options.

The UE may have a plurality of configured PUCCH resource sets having at least five distinct values for a first symbol. The PUCCH resource set index may correspond to a configured PUCCH resource set of the plurality of configured PUCCH resource sets having a configured first symbol having one of the at least five distinct values for a first symbol. The configured first symbol may be the scheduled first symbol.

The scheduled resources of the PUCCH may include a scheduled interlace, and the PUCCH resource set index may correspond to a configured PUCCH resource set having an interlace index corresponding to the scheduled interlace.

In some aspects, a bandwidth part may include non-abbreviated interlaces and abbreviated interlaces and the scheduled interlace is a non-abbreviated interlace. An abbreviated interlace may be an interlace that includes a resource block that overlaps with a guard band, and a non-abbreviated interlace may be an interlace that does not include the resource block that overlaps with the guard band.

At block 1606, the base station transmits the PUCCH resource set index to the UE and transmits the PRI to the UE at the PDCCH location. For example, 1606 may be performed by the transmission component 1710.

At block 1608, the base station demultiplexes the PUCCH based on at least one of the scheduled TD-OCC, the scheduled cyclic shift step size, the scheduled first symbol, or the scheduled cyclic shift set to receive the uplink control information of the UE. For example, 1608 may be performed by the demultiplexer component 1716.

Figure 17:
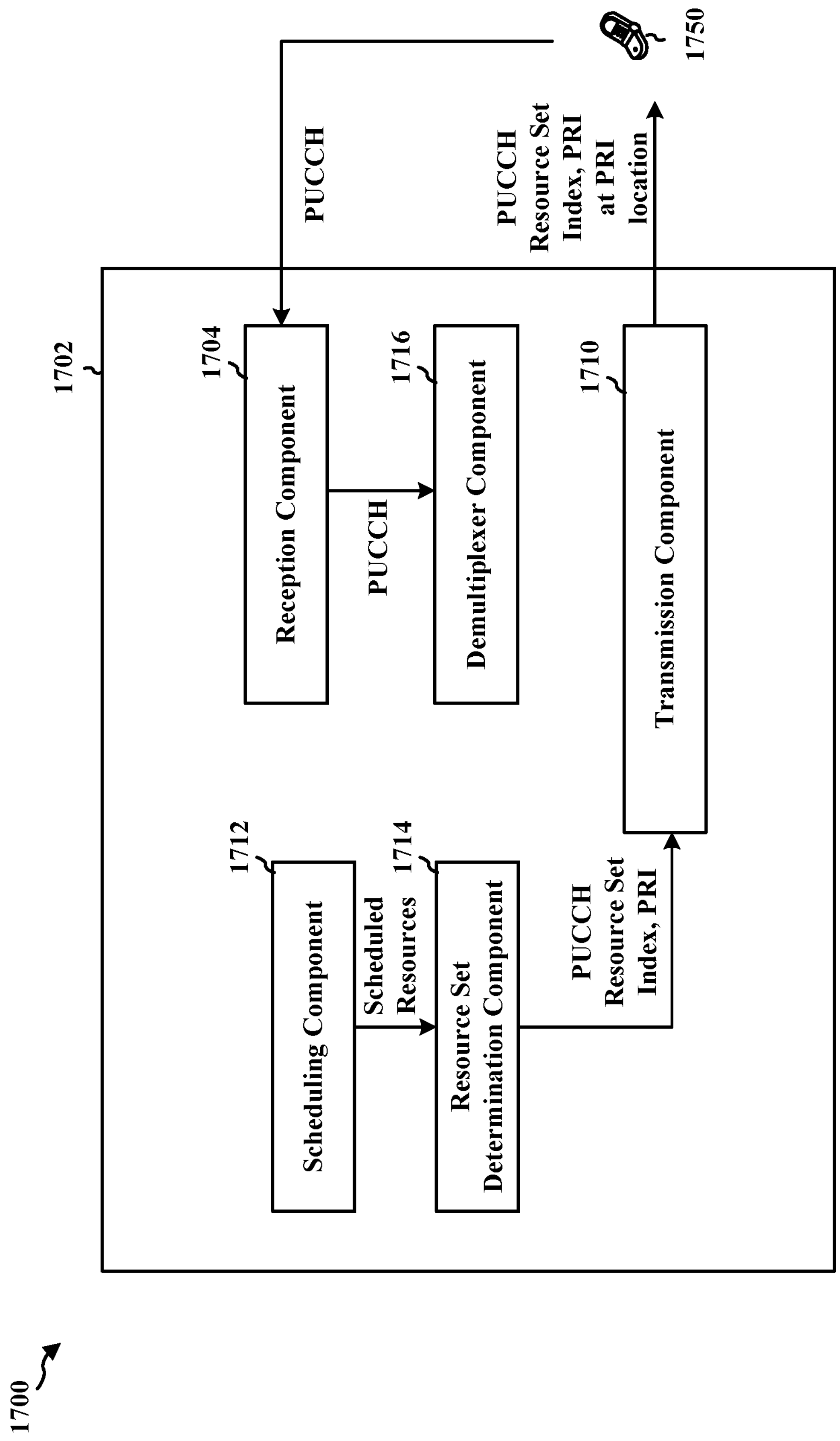
FIG. 17 is a conceptual data flow diagram illustrating an example data flow between different means/components in an example apparatus.

FIG. 17 is a conceptual data flow diagram 1700 illustrating an example data flow between different means/components in an example apparatus 1702. The apparatus may be a base station. The apparatus includes a scheduling component 1712 that schedules a UE to transmit on scheduled resources of a PUCCH, the scheduled resources having a scheduled TD-OCC, a scheduled cyclic shift step size, a scheduled first symbol, or a scheduled cyclic shift set, such as described in connection with 1602. The apparatus includes a resource set determination component 1714 that receives the scheduled resources and determines a PUCCH resource set index, a PRI, and a PRI location corresponding to the scheduled resources, such as described in connection with 1604. The apparatus includes a transmission component 1710 that receives the PUCCH resource set index, the PRI, and the PRI location and transmits the PUCCH resource set index and transmits a PDCCH with the PRI at the PRI location to a UE 1750, such as described in connection with 1606. The apparatus includes a reception component 1704 that receives the PUCCH from the UE 1750 and includes a demultiplexer component 1716 that receives the PUCCH from the reception component 1704 and demultiplexes the PUCCH based on at least one of the scheduled TD-OCC, the scheduled cyclic shift size, the scheduled first symbol, or the scheduled cyclic shift set to receive the uplink control information for the UE 1750, such as described in connection with 1608.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
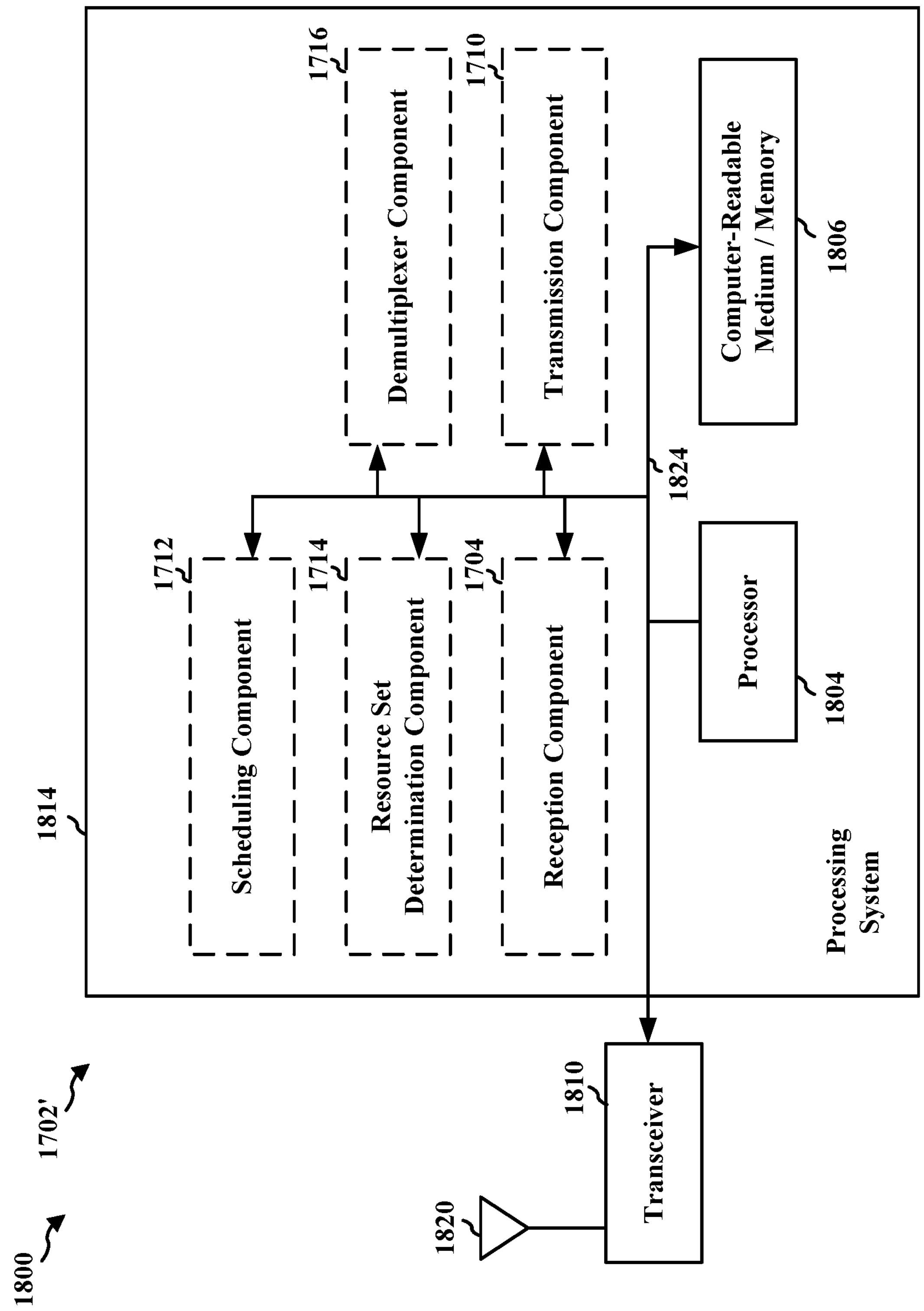
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors or hardware components, represented by the processor 1804, the components 1704, 1710, 1712, 1714, 1716, and the computer-readable medium/memory 1806. The bus 1824 also may link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1710, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described above for any particular apparatus. The computer-readable medium/memory 1806 also may be used for storing data that is manipulated by the processor 1804 when executing software. The processing system 1814 further includes at least one of the components 1704, 1710, 1712, 1714, 1716. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 or at least one of the TX processor 316, the RX processor 370, and the controller/processor 375. Alternatively, the processing system 1814 may be the entire base station (such as see 310 of FIG. 3).

In one configuration, the apparatus 1702/1702' for wireless communication includes means for scheduling a UE to transmit uplink control information on scheduled resources of a PUCCH, the scheduled resources having at least one of a scheduled TD-OCC, a scheduled cyclic shift step size, a scheduled first symbol, or a scheduled cyclic shift set, means for determining a PUCCH resource set index, a PRI, and a PDCCH location for the PRI corresponding to the scheduled resources of the PUCCH, means for transmitting the PUCCH resource set index to the UE, means for transmitting the PRI to the UE at the PDCCH location, and means for demultiplexing the PUCCH based on at least one of the scheduled TD-OCC, the scheduled cyclic shift step size, the scheduled first symbol, or the scheduled cyclic shift set to receive the uplink control information of the UE. The aforementioned means may be one or more of the aforementioned components of the apparatus 1702 or the processing system 1814 of the apparatus 1702' configured to perform the functions recited by the aforementioned means. As described, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
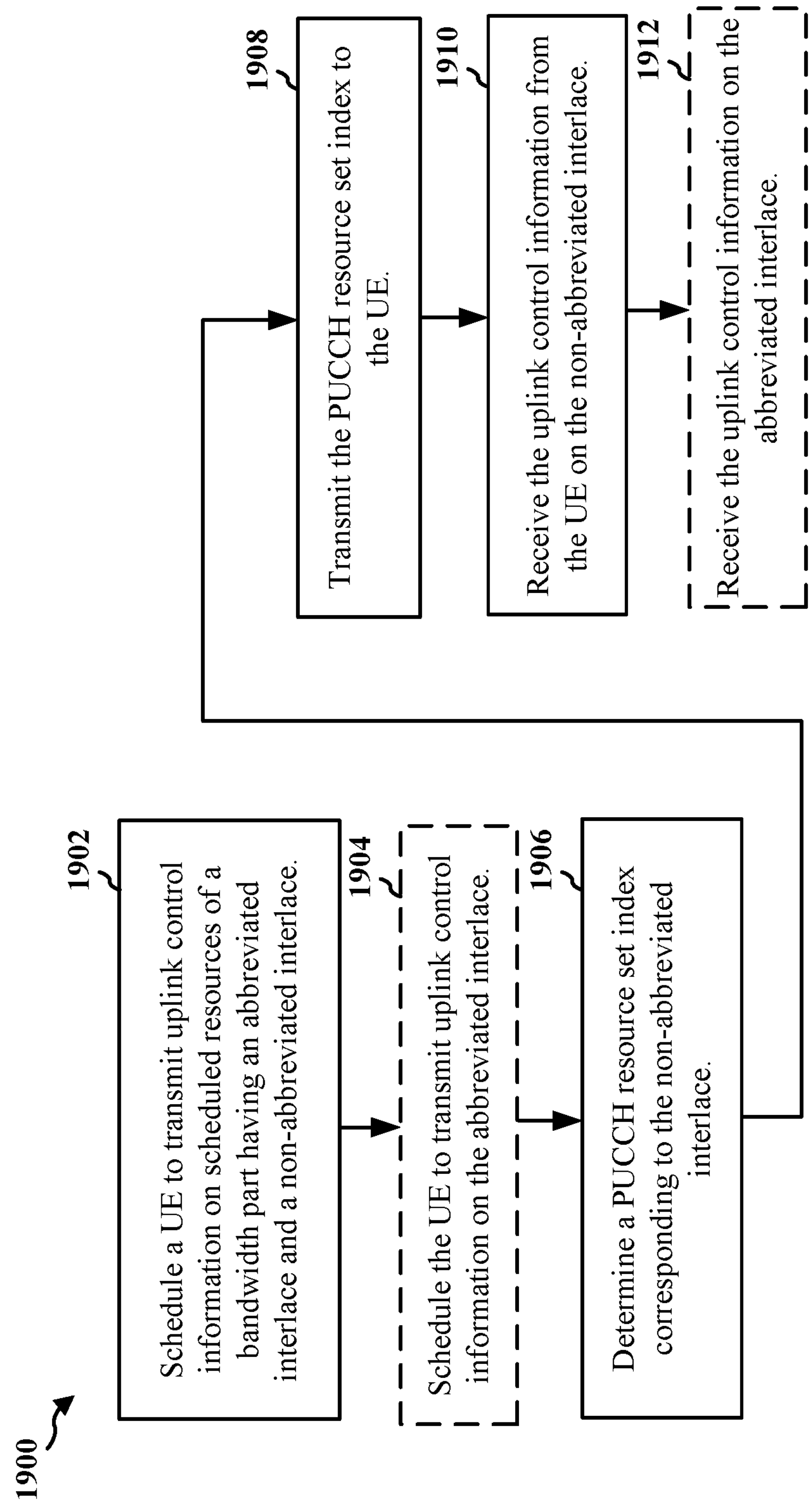
FIG. 19 is a flowchart of an example method of wireless communication.

FIG. 19 is a flowchart 1900 of an example method of wireless communication. The method may be performed by a base station 1204 (such as the base station 1204; the apparatus 2002/2002'; the processing system 2114, which may include the memory 376 and which may be the entire base station 1204 or a component of the base station 1204, such as the TX processor 316, the RX processor 370, or the controller/processor 375).

At block 1902, the base station schedules a UE to transmit uplink control information on scheduled resources of a bandwidth part, the bandwidth part including an abbreviated interlace and a non-abbreviated interlace. For example, 1902 may be performed by the scheduling component 2012. In some aspects, as illustrated at block 1904, the base station may schedule the UE to transmit uplink control information on the abbreviated interlace and the non-abbreviated interlace. The scheduled resources may include interlaces having R RBs, R not being equal to $(2^m)*(3^n)*(5^p)$, where R is a positive integer and m, n, and p are all non-negative integers.

At block 1906, the base station determines a PUCCH resource set index corresponding to the non-abbreviated interlace. For example, 1906 may be performed by interlace determination component 2014. An abbreviated interlace is an interlace that includes a resource block that overlaps with a guard band, and a non-abbreviated interlace may be an interlace that does not include the resource block that overlaps with the guard band.

At block 1908, the base station transmits the PUCCH resource set index to the UE. For example, 1908 can be performed by the transmission component 2010.

At block 1910, the base station receives the uplink control information from the UE on the non-abbreviated interlace. For example, 1910 can be performed by the reception component 2004. In some aspects, as illustrated at block 1912, the base station may receive the uplink control information from the UE on the non-abbreviated interlace and the abbreviated interlace.

Figure 20:
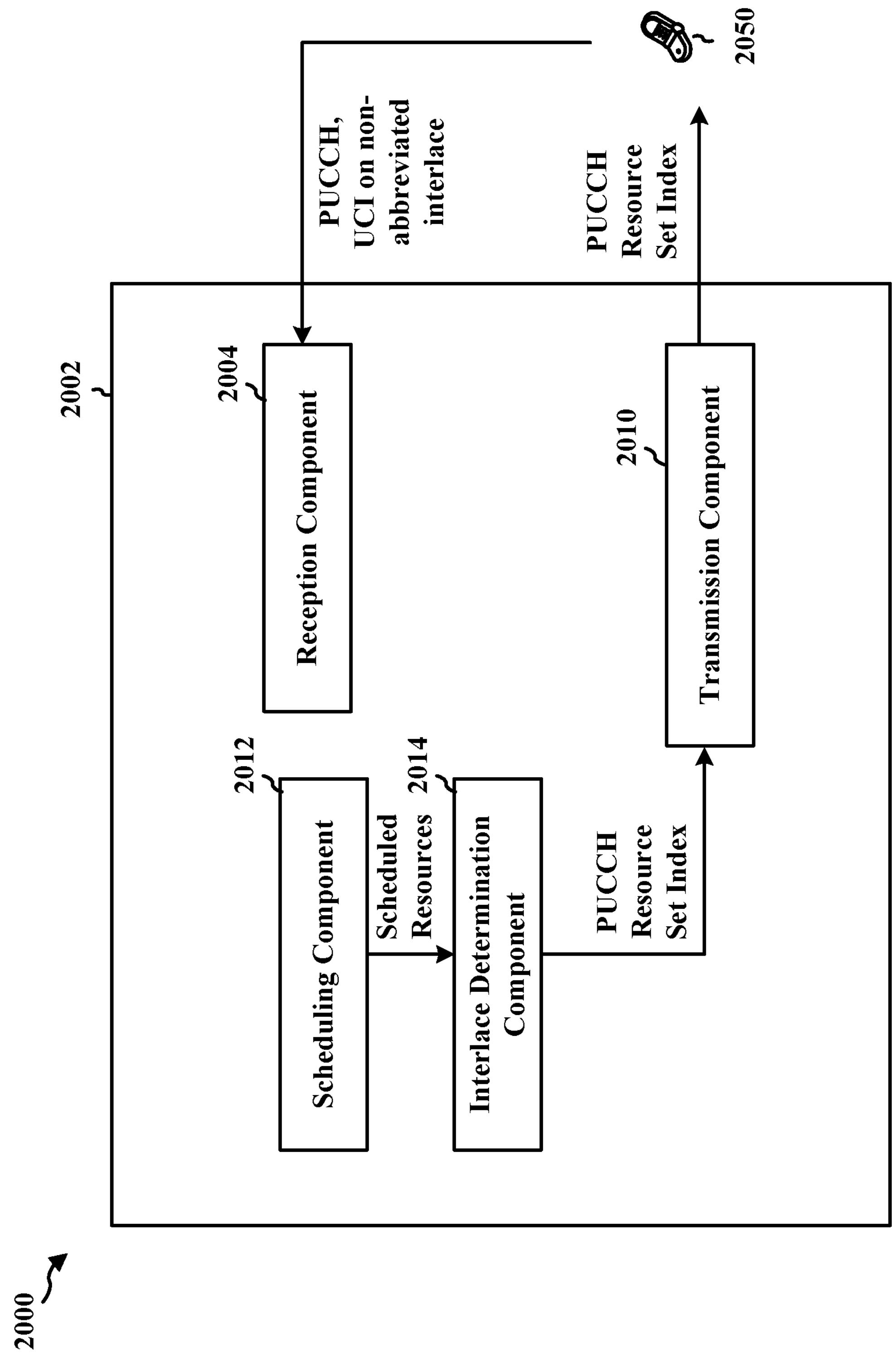
FIG. 20 is a conceptual data flow diagram illustrating an example data flow between different means/components in an example apparatus.

FIG. 20 is a conceptual data flow diagram 2000 illustrating an example data flow between different means/components in an example apparatus 2002. The apparatus may be a base station. The apparatus includes a scheduling component 2012 that schedules a UE to transmit uplink control information on scheduled resources of a bandwidth part having an abbreviated interlace and a non-abbreviated interlace, the scheduled resources including a non-abbreviated interlace, such as described in connection with 1902. The apparatus includes an interlace determination component 2014 that receives the scheduled resources and determines a PUCCH resource set index corresponding to the non-abbreviated interlace of the scheduled resources, such as described in connection with 1906. The apparatus includes a transmission component 2010 that transmits the determined PUCCH resource set index to a UE 2050, such as described in connection with 1908. The apparatus includes a reception component 2004 that receives the PUCCH from the UE 2050, including the uplink control information, transmitted on a non-abbreviated interlace of the PUCCH.

The apparatus may include additional components that perform each of the blocks of the algorithm in the aforementioned flowchart of FIG. 19. As such, each block in the aforementioned flowchart of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
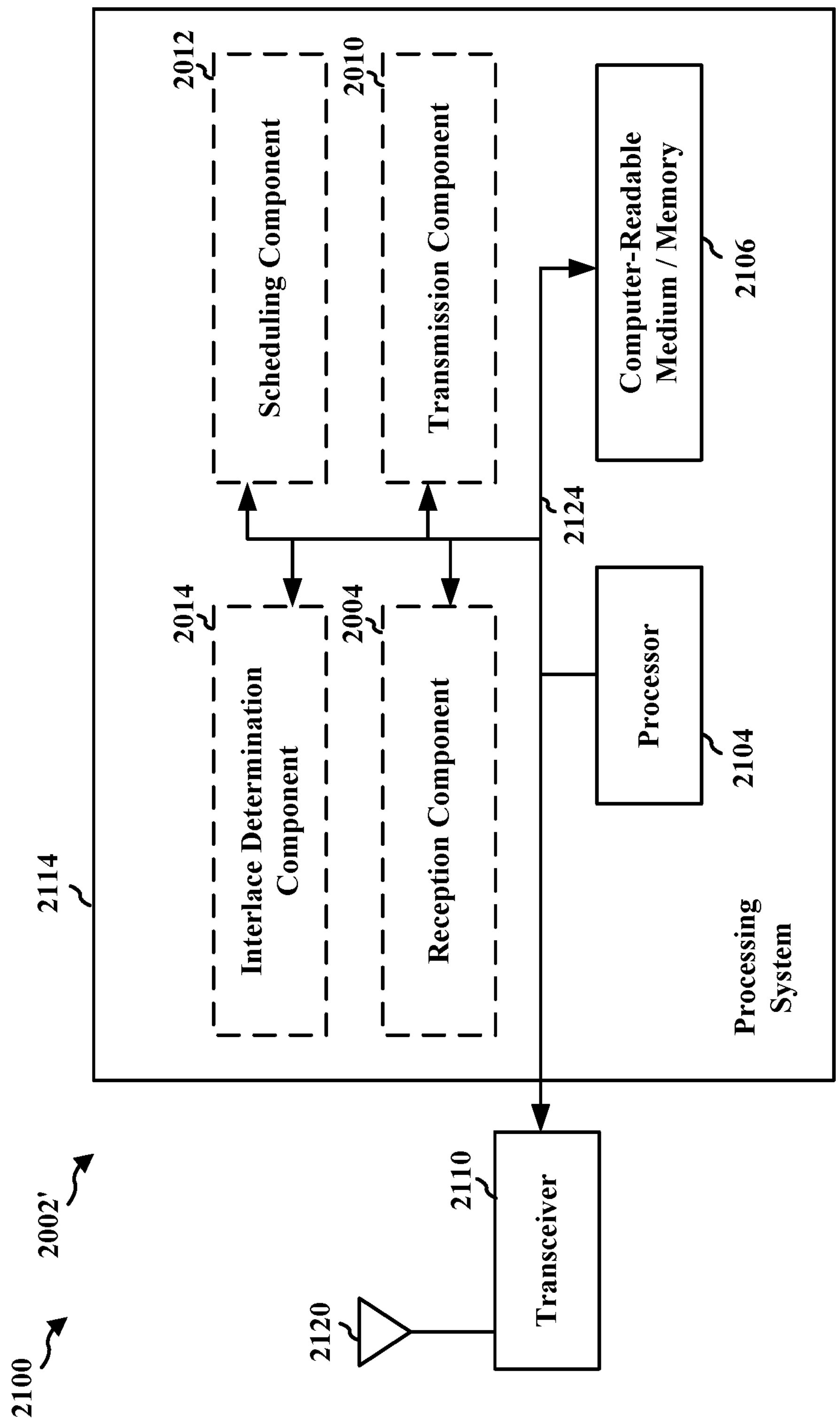
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors or hardware components, represented by the processor 2104, the components 2004, 2010, 2012, 2014, and the computer-readable medium/memory 2106. The bus 2124 also may link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2004. In addition, the transceiver 2110 receives information from the processing system 2114, specifically the transmission component 2010, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described above for any particular apparatus. The computer-readable medium/memory 2106 also may be used for storing data that is manipulated by the processor 2104 when executing software. The processing system 2114 further includes at least one of the components 2004, 2010, 2012, 2014. The components may be software components running in the processor 2104, resident/stored in the computer readable medium/memory 2106, one or more hardware components coupled to the processor 2104, or some combination thereof. The processing system 2114 may be a component of the base station 310 and may include the memory 376 or at least one of the TX processor 316, the RX processor 370, and the controller/processor 375. Alternatively, the processing system 2114 may be the entire base station (such as see 310 of FIG. 3).

In one configuration, the apparatus 2002/2002' for wireless communication includes means for scheduling a UE to transmit uplink control information on scheduled resources of a bandwidth part, the bandwidth part including an abbreviated interlace and a non-abbreviated interlace, means for determining a PUCCH resource set index corresponding to the non-abbreviated interlace, means for transmitting the PUCCH resource set index to the UE, and means for receiving the uplink control information from the UE on the non-abbreviated interlace. The aforementioned means may be one or more of the aforementioned components of the apparatus 2002 or the processing system 2114 of the apparatus 2002' configured to perform the functions recited by the aforementioned means. As described above, the processing system 2114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication at a user equipment (UE), comprising:

receiving:

a physical uplink control channel (PUCCH) resource set index, and a channel resource indicator associated with a resource location of a downlink channel;

determining a PUCCH resource index from the channel resource indicator and the resource location; and transmitting uplink control information on a PUCCH associated with a PUCCH resource set, wherein the PUCCH resource set index indicates a time-division orthogonal cover code (TD-OCC), of a plurality of TD-OCCs, that is used to encode the uplink control information, and wherein:

the uplink control information is transmitted using an interlace when an indication to use the interlace is received in information associated with the PUCCH resource set, the interlace corresponding to an interlace index that is associated with the PUCCH resource index, or the uplink control information is transmitted with a frequency hopping pattern that is associated with the PUCCH resource index.

2. The method of claim 1, wherein the PUCCH resource set index corresponds to a configured PUCCH resource set having the plurality of TD-OCCs, wherein the TD-OCC of the PUCCH resource set is selected from the plurality of TD- OCCs based on the PUCCH resource index, and wherein the uplink control information is transmitted based on the TD-OCC of the PUCCH resource set.

3. The method of claim 2, wherein the TD-OCC and a first symbol of the PUCCH resource set are based on at least one of the PUCCH resource set index or the PUCCH resource index.

4. The method of claim 1, wherein:

a cyclic shift set of the PUCCH resource set is determined based on at least one of the PUCCH resource set index or the PUCCH resource index, the UE has a plurality of configured PUCCH resource sets having at least two cyclic shift sets, the two cyclic shift sets having no common values, the PUCCH resource set index corresponds to a configured PUCCH resource set of the plurality of configured PUCCH resource sets having a configured cyclic shift set that is one of the at least two cyclic shift sets having no common values, the cyclic shift set of the PUCCH resource set is determined to be the configured cyclic shift set, and the uplink control information is transmitted based on the cyclic shift set of the PUCCH resource set.

5. The method of claim 1, wherein the PUCCH resource set index corresponds to a configured PUCCH resource set having a set of first symbol options, wherein a first symbol of the PUCCH resource set is selected from the set of first symbol options based on the PUCCH resource index, and wherein the uplink control information is transmitted based on the first symbol of the PUCCH resource set.

6. The method of claim 5, wherein the configured PUCCH resource set has a configured number of symbols, and wherein each first symbol of the set of first symbol options is separated from the other first symbols of the set of first symbol options by at least a number of symbols equal to the configured number of symbols.

7. The method of claim 5, wherein the set of first symbol options includes four and ten, and wherein a configured number of symbols of the configured PUCCH resource set is four.

8. The method of claim 1, further comprising:

transmitting at least a portion of the uplink control information on a PUCCH resource that corresponds to the PUCCH resource index.

9. The method of claim 1, wherein the PUCCH resource index is K, K being greater than a number of available resource combinations associated with the PUCCH resource set, and the PUCCH resource corresponds to the Kth PUCCH resource index.

10. The method of claim 1, wherein transmission of the uplink control information includes one of an interlaced transmission or a frequency hopping transmission, and the transmission of the uplink control information excludes the other one of the interlaced transmission or the frequency hopping transmission.

11. A user equipment (UE), comprising:

a processing system that includes processor circuitry and memory circuitry that stores code, the processing system configured to cause the UE to:

obtain:

a physical uplink control channel (PUCCH) resource set index, and;

a channel resource indicator associated with a resource location of a downlink channel;

determine a PUCCH resource index from the channel resource indicator and the resource location;

encode uplink control information for transmission on a PUCCH associated with a PUCCH resource set, wherein the PUCCH resource set index indicates a time-division orthogonal cover code (TD-OCC), of a plurality of TD-OCCs, that is used to encode the uplink control information, and wherein:

the uplink control information is transmitted using an interlace when an indication to use the interlace is received in information associated with the PUCCH resource set, the interlace corresponding to an interlace index that is associated with the PUCCH resource index, or the uplink control information is transmitted with a frequency hopping pattern that is associated with the PUCCH resource index; and output the uplink control information on the PUCCH associated with the PUCCH resource set.

12. The UE of claim 11, wherein the PUCCH resource set index corresponds to a configured PUCCH resource set having the plurality of TD-OCCs, wherein the TD-OCC of the PUCCH resource set is selected from the plurality of TD-OCCs based on the PUCCH resource index, and wherein the uplink control information is transmitted based on the TD-OCC of the PUCCH resource set.

13. The UE of claim 11, wherein:

the processing system is further configured to cause the UE to determine a cyclic shift set of the PUCCH resource set based on at least one of the PUCCH resource set index or the PUCCH resource index, the UE has a plurality of configured PUCCH resource sets having at least two cyclic shift sets, the two cyclic shift sets having no common values, the PUCCH resource set index corresponds to a configured PUCCH resource set of the plurality of configured PUCCH resource sets having a configured cyclic shift set that is one of the at least two cyclic shift sets having no common values, the cyclic shift set of the PUCCH resource set is determined to be the configured cyclic shift set, and the uplink control information is transmitted based on the cyclic shift set of the PUCCH resource set.

14. The UE of claim 11, wherein the PUCCH resource set index corresponds to a configured PUCCH resource set having a set of first symbol options, wherein a first symbol of the PUCCH resource set is selected from the set of first symbol options based on the PUCCH resource index, and wherein the uplink control information is transmitted based on the first symbol of the PUCCH resource set.

15. The UE of claim 14, wherein the configured PUCCH resource set has a configured number of symbols, and wherein each first symbol of the set of first symbol options is separated from the other first symbols of the set of first symbol options by at least a number of symbols equal to the configured number of symbols.

16. The UE of claim 14, wherein the set of first symbol options includes four and ten, and wherein a configured number of symbols of the configured PUCCH resource set is four.

17. The UE of claim 11, wherein the processing system is further configured to cause the UE to:

output at least a portion of the uplink control information on a PUCCH resource based on at least one of the PUCCH resource set or the PUCCH resource index.

18. The UE of claim 11, wherein the PUCCH resource index is K, K being greater than a number of available resource combinations associated with the PUCCH resource set, and the PUCCH resource corresponds to the Kth PUCCH resource index.

19. The UE of claim 11, wherein transmission of the uplink control information includes one of an interlaced transmission or a frequency hopping transmission, and the transmission of the uplink control information excludes the other one of the interlaced transmission or the frequency hopping transmission.

20. A user equipment (UE) for wireless communication, comprising:

a processing system that includes processor circuitry and memory circuitry that stores code, the processing system configured to cause the UE to:

obtain a physical uplink control channel (PUCCH) resource set index from a base station:

encode uplink control information for transmission on a PUCCH associated with a PUCCH resource set, wherein the PUCCH resource set index indicates a time-division orthogonal cover code (TD-OCC), of a plurality of TD-OCCs, that is used to encode the uplink control information, and wherein:

the uplink control information is transmitted using an interlace when an indication to use the interlace is received in information associated with the PUCCH resource set, the interlace corresponding to an interlace index that is associated with a PUCCH resource index, or the uplink control information is transmitted with a frequency hopping pattern that is associated with the PUCCH resource index; and wherein the TD-OCC and a first symbol of the PUCCH resource set are based on at least one of the PUCCH resource set index or the PUCCH resource indexi and output the uplink control information on the PUCCH associated with the PUCCH resource set.

21. A method of wireless communication at a base station, comprising:

scheduling a user equipment (UE) to transmit uplink control information on scheduled resources of a physical uplink control channel (PUCCH), the scheduled resources being configured with one of an interlace or frequency hopping and the scheduled resources being further configured without the other one of the interlace or the frequency hopping;

transmitting at least one of a PUCCH resource set index or a PUCCH resource indicator (PRI) to the UE, the at least one of the PUCCH resource set index associated with the one of the interlace or the frequency hopping configured for the scheduled resources; and demultiplexing uplink control information received on the scheduled resources of the PUCCH according to the one of the interlace or the frequency hopping, wherein the uplink control information is received with a time-division orthogonal cover code (TD-OCC), of a plurality of TD-OCCs that are respectively associated with a plurality of PUCCH resource indexes, the PUCCH resource set index indicating the TD-OCC of the plurality of TD-OCCs; and the PUCCH resource set index corresponds to a configured PUCCH resource set of a plurality of configured PUCCH resource sets having a configured cyclic shift set, the configured cyclic shift set is a scheduled cyclic shift set, wherein at least one of the PUCCH resource set index, the PRI, or a physical downlink control channel (PDCCH) location for downlink control information including the PRI is associated with the scheduled cyclic shift set.

22. The method of claim 21, wherein the PUCCH resource set index corresponds to a configured PUCCH resource set having the plurality of TD-OCCs, and wherein at least one of the PRI or a PDCCH location of downlink control information including the PRI on the PDCCH correspond to a position of the TD-OCC in the plurality of TD-OCCs configured for the scheduled resources.

23. The method of claim 21, wherein:

the plurality of configured PUCCH resource sets include at least two cyclic shift sets, the two cyclic shift sets having no common values, and the PUCCH resource set index includes one of the at least two cyclic shift sets having no common values.

24. The method of claim 21, wherein the PUCCH resource set index corresponds to a configured PUCCH resource set having a set of first symbol options, the set of first symbol options including a scheduled first symbol of the scheduled resources, and wherein at least one of the PRI or a PDCCH location of downlink control information including the PRI on the PDCCH correspond to a position of the scheduled first symbol in the set of first symbol options.

25. The method of claim 21, wherein the PRI is based on an interlace index that corresponds to the interlace when the interlace is configured for the scheduled resources.

26. An apparatus for wireless communication, comprising:

a processing system that includes processor circuitry and memory circuitry that stores code, the processing system configured to cause the apparatus to:

schedule a user equipment (UE) to transmit uplink control information on scheduled resources of a PUCCH, the scheduled resources being configured with one of an interlace or frequency hopping and the scheduled resources being further configured without the other one of the interlace or the frequency hopping; and demultiplex uplink control information received on the scheduled resources of the PUCCH according to the one of the interlace or the frequency hopping; and output, for transmission to the UE, at least one of a PUCCH resource set index or a PUCCH resource indicator (PRI), the at least one of the PUCCH resource set index or the PRI being associated with the one of the interlace or the frequency hopping configured for the scheduled resources, wherein the uplink control information is received with a time-division orthogonal cover code (TD-OCC), of a plurality of TD-OCCs that are respectively associated with a plurality of PUCCH resource indexes, the PUCCH resource set index indicating the TD-OCC of the plurality of TD-OCCs; and the PUCCH resource set index corresponds to a configured PUCCH resource set of a plurality of configured PUCCH resource sets having a configured cyclic shift set, the configured cyclic shift set is a scheduled cyclic shift set, wherein at least one of the PUCCH resource set index, the PRI, or a physical downlink control channel (PDCCH) location for downlink control information including the PRI is associated with the scheduled cyclic shift set.

27. The apparatus of claim 26, wherein the PUCCH resource set index corresponds to a configured PUCCH resource set having the plurality of TD-OCCs, and wherein at least one of the PRI or a PDCCH location of downlink control information including the PRI on the PDCCH correspond to a position of the TD-OCC in the plurality of TD- OCCs configured for the scheduled resources.

28. The apparatus of claim 26, wherein:

the plurality of configured PUCCH resource sets include at least two cyclic shift sets, the two cyclic shift sets having no common values, and the PUCCH resource set index includes one of the at least two cyclic shift sets having no common values.

29. The apparatus of claim 26, wherein the PUCCH resource set index corresponds to a configured PUCCH resource set having a set of first symbol options, the set of first symbol options including a scheduled first symbol of the scheduled resources, and wherein at least one of the PRI or a PDCCH location of downlink control information including the PRI on the PDCCH correspond to a position of the scheduled first symbol in the set of first symbol options.

30. The apparatus of claim 26, wherein the PRI is based on an interlace index that corresponds to the interlace when the interlace is configured for the scheduled resources.

* * * * *